(12) United States Patent
Haga

(10) Patent No.: US 10,415,514 B2
(45) Date of Patent: Sep. 17, 2019

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Hiroyuki Haga, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 9 days.

(21) Appl. No.: 15/903,095

(22) Filed: Feb. 23, 2018

(65) Prior Publication Data

US 2018/0245546 A1 Aug. 30, 2018

(30) Foreign Application Priority Data

Feb. 27, 2017 (JP) ................................ 2017-034844

(51) Int. Cl.

| | |
|---|---|
| *F02M 26/26* | (2016.01) |
| *F02M 26/06* | (2016.01) |
| *F02M 26/33* | (2016.01) |
| *F02M 26/47* | (2016.01) |
| *F02D 21/08* | (2006.01) |
| *F02D 41/00* | (2006.01) |
| *F02D 41/10* | (2006.01) |

(Continued)

(52) U.S. Cl.
CPC ......... *F02M 26/26* (2016.02); *F02B 29/0418* (2013.01); *F02B 29/0493* (2013.01); *F02D 21/08* (2013.01); *F02D 41/005* (2013.01); *F02D 41/0072* (2013.01); *F02D 41/10* (2013.01); *F02M 26/06* (2016.02); *F02M 26/33* (2016.02); *F02M 26/47* (2016.02); *F02P 5/045* (2013.01); *F02P 5/1516* (2013.01); *F02D 43/00* (2013.01); *F02D 2021/083* (2013.01); *F02D 2041/0075* (2013.01); *F02D 2200/0414* (2013.01); *F02D 2200/0418* (2013.01); *F02P 5/1528* (2013.01)

(58) Field of Classification Search
CPC ........ F02M 26/25; F02M 26/26; F02M 26/33; F02M 26/47; F02M 26/06; F02B 29/0418; F02B 29/0493; F02D 21/08; F02D 41/005; F02D 41/0072; F02D 41/10; F02D 2021/083; F02D 2041/0075; F02P 5/045; F02P 5/1516
USPC .................................................... 123/568.12
See application file for complete search history.

(56) References Cited

U.S. PATENT DOCUMENTS

2009/0308071 A1* 12/2009 Yamashita .......... F02B 29/0418
60/602
2015/0128587 A1* 5/2015 Dane ...................... F02M 45/02
60/605.2

FOREIGN PATENT DOCUMENTS

| EP | 3187719 A1 | 7/2017 |
|---|---|---|
| JP | 9-256915 A | 9/1997 |

(Continued)

*Primary Examiner* — Mahmoud Gimie
(74) *Attorney, Agent, or Firm* — Sughrue Mion, PLLC

(57) ABSTRACT

An internal combustion engine includes an intercooler configured to cool an intake gas compressed by a compressor, a cooler bypass passage configured to bypass the intercooler, and a cooler bypass valve configured to open and close the cooler bypass passage, and an exhaust gas recirculation gas is introduced into an upstream side of the intercooler. An electronic control unit is configured to open the cooler bypass valve during use of a high exhaust gas recirculation rate region, and to close the cooler bypass valve during use of a low exhaust gas recirculation rate region.

8 Claims, 10 Drawing Sheets

(51) Int. Cl.
  *F02B 29/04*   (2006.01)
  *F02P 5/04*   (2006.01)
  *F02P 5/15*   (2006.01)
  F02D 43/00   (2006.01)
  F02P 5/152   (2006.01)

(56) References Cited

FOREIGN PATENT DOCUMENTS

| | | |
|---|---|---|
| JP | 2003-322039 A | 11/2003 |
| JP | 2007-211595 A | 8/2007 |
| JP | 2015-94291 A | 5/2015 |
| JP | 2016-050485 A | 4/2016 |
| WO | 2015/071723 A2 | 5/2015 |

* cited by examiner

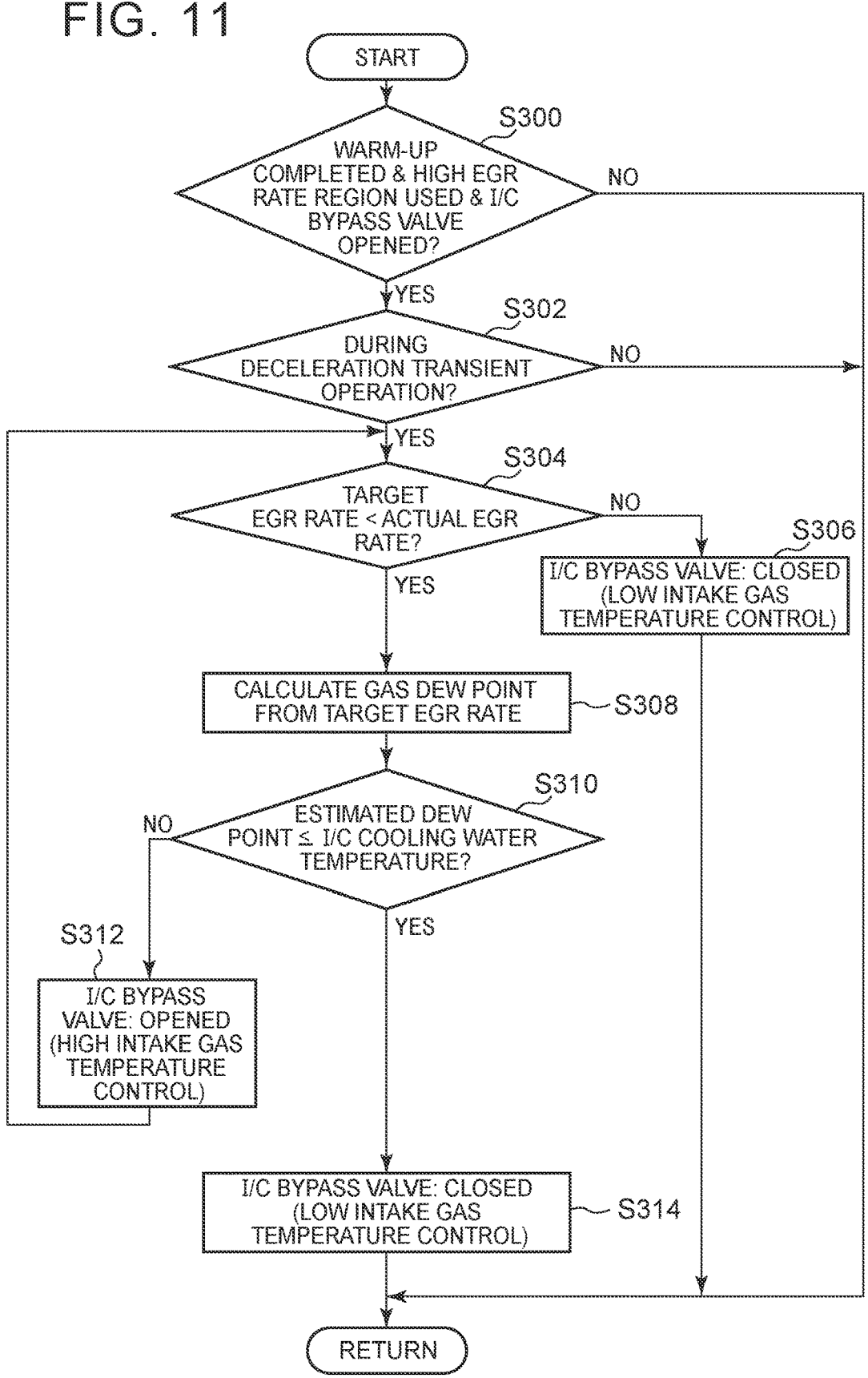

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2017-034844 filed on Feb. 27, 2017 including the specification, drawings and abstract is incorporated herein by reference in its entirety.

BACKGROUND

1. Technical Field

The present disclosure relates to a control device for an internal combustion engine and a control method for an internal combustion engine. More specifically, the present disclosure relates to a control device for an internal combustion engine configured such that an EGR gas is introduced into an intake passage on an upstream side relative to an intercooler, and a control method for the internal combustion engine.

2. Description of Related Art

For example, Japanese Patent Application Publication No. 2007-211595 (JP 2007-211595 A) describes an internal combustion engine including a turbosupercharger, an intercooler, and a low-pressure EGR device. An EGR passage provided in the low-pressure EGR device connects an intake passage on an upstream side relative to a compressor of the turbosupercharger to an exhaust passage on a downstream side relative to a turbine of the turbosupercharger. The intercooler is placed on the downstream side relative to the compressor. Accordingly, in the low-pressure EGR device, the EGR gas is introduced into the intake passage on the upstream side relative to the intercooler.

SUMMARY

In order to improve thermal efficiency of the internal combustion engine, it is effective to increase an EGR rate. Some internal combustion engines have a configuration in which an EGR gas is introduced into an intake passage on an upstream side relative to an intercooler, like the internal combustion engine described in JP 2007-211595 A. In the internal combustion engines having this configuration, when a fuel mixture of an intake air and an EGR gas is cooled in the intercooler to a dew point of the fuel mixture or less, condensed water is generated. When condensed water is generated, a problem such as corrosion of an intake passage wall might occur. On this account, it is necessary to restrain generation of condensed water.

One well-known measure to restrain the generation of condensed water is to increase a temperature of an intake air gas (the fuel mixture) to be higher than the dew point. When the EGR rate becomes high, the dew point becomes high due to an increase in an amount of moisture content included in the intake gas. Accordingly, when the EGR rate is increased, a value of an intake gas temperature to be required to restrain the generation of condensed water increases. When the intake gas temperature increases, knocking easily occurs in a heavy load region. When an ignition timing is retarded to restrain knocking, thermal efficiency decreases.

Accordingly, under the common general technical knowledge at the time of filing of the present application, it was difficult to sufficiently increase the EGR rate while balancing restraint of generation of condensed water with restraint of knocking. In this regard, due to diligent studies of inventor(s) of the present disclosure, the following finding was obtained. That is, it was found that, with the use of a "high EGR rate" of 25% or more, it is possible to improve thermal efficiency even under a high intake gas temperature, while restraining knocking at the same level as a case under a low intake gas temperature.

In the meantime, in the heavy load region, under the same high intake gas temperature, when the EGR rate increases, a combustion gas temperature decreases. Accordingly, in the heavy load region, under the same high intake gas temperature, knocking easily occurs when the low EGR rate is lower. Accordingly, when the high intake gas temperature is used, it is possible to obtain a good combustion characteristic in terms of knocking restraint and thermal efficiency improvement in a high EGR rate region that requires the high EGR rate, but in a low EGR rate region that requires a low EGR rate (including zero) of less than 25%, the use of the high intake gas temperature requires improvement in a viewpoint of knocking restraint (and restraint of engine torque fluctuation along with this).

The present disclosure relates to an internal combustion engine configured such that an EGR gas is introduced into an intake passage on an upstream side relative to an intercooler and a high EGR rate of 25% or more is used to improve thermal efficiency, and provides a technique to balance restraint of knocking with restraint of generation of condensed water even if either of a high EGR rate region that requires a high EGR rate and a low EGR rate region that requires a low EGR rate, which is less than the high EGR rate, is being used.

A first aspect of the present disclosure relates to a control device for an internal combustion engine. The internal combustion engine includes an ignition device configured to ignite a fuel and air mixture in a cylinder, a supercharger including a compressor provided in an intake passage, an intercooler configured to cool an intake gas compressed by the compressor, an exhaust gas recirculation device including an exhaust gas recirculation passage configured to connect the intake passage on an upstream side relative to the intercooler to an exhaust passage, a cooler bypass passage connected to the intake passage so as to bypass the intercooler, a passage switching valve configured to switch between a cooler passing passage mode in which the intake gas passes through the intercooler and a cooler bypass passage mode in which the intake gas passes through the cooler bypass passage, and an electronic control unit. The electronic control unit is configured to control the passage switching valve such that the cooler bypass passage mode is selected while at least part of a high exhaust gas recirculation rate region requesting a high exhaust gas recirculation rate of 25% or more is used. The electronic control unit is configured to control the passage switching valve such that the cooler passing passage mode is selected while at least part of a low exhaust gas recirculation rate region requesting a low exhaust gas recirculation rate of less than 25% is used. The high exhaust gas recirculation rate region and the low exhaust gas recirculation rate region are included in an operating region of the internal combustion engine.

In the above configuration, the cooler bypass passage mode is selected while at least part of the high exhaust gas recirculation rate region requesting the high exhaust gas recirculation rate of 25% or more is used, such that the high exhaust gas recirculation rate is used under a high intake gas temperature. Hereby, it is possible to achieve improvement of thermal efficiency by use of the high exhaust gas recirculation rate while balancing restraint of generation of condensed water by use of the high intake gas temperature with restraint of knocking by use of the high exhaust gas recirculation rate. In the meantime, the cooler passing passage mode is selected while at least part of the low exhaust gas recirculation rate region requesting the low exhaust gas recirculation rate of less than 25% is used, such that the low exhaust gas recirculation rate is used under a low intake gas temperature. Hereby, even if a using region within the low exhaust gas recirculation rate region is a heavy load region, it is possible to balance restraint of knocking by use of the low intake gas temperature with restrain of generation of condensed water due to the exhaust gas recirculation rate being zero or low. Thus, it is possible to balance the restraint of knocking with the restraint of generation of condensed water even when either of the high exhaust gas recirculation rate region and the low exhaust gas recirculation rate region is being used. Further, in the above configuration, the passage switching valve that can change an intake-gas flow passage mode between the cooler passing passage mode and the cooler bypass passage mode is used, such that the intake gas temperature can be changed with a high response. Hereby, it is possible to change the intake gas temperature while successfully restraining generation of knocking and condensed water caused due to a delay in change of the intake gas temperature.

In the control device, the electronic control unit may be configured not to control the passage switching valve such that the cooler bypass passage mode is selected, during an increase delay period of an actual exhaust gas recirculation rate with respect to a target exhaust gas recirculation rate at a time of shifting from the low exhaust gas recirculation rate region to the high exhaust gas recirculation rate region.

In the control device, the electronic control unit may be configured to permit the passage switching valve to be controlled such that the cooler bypass passage mode is selected, when a dew point of a fuel mixture of the intake air and an exhaust gas recirculation gas increases to a temperature of cooling water or more during the increase delay period, the cooling water being circulating through the intercooler.

In the control device, the electronic control unit may be configured to control the ignition device such that an ignition timing is retarded, when an engine torque fluctuation is higher than a determination value during the increase delay period after the passage switching valve is controlled such that the cooler bypass passage mode is selected, along with the increase of the dew point of the fuel mixture to the temperature of the cooling water or more.

In the control device, the electronic control unit may be configured not to control the passage switching valve such that the cooler passing passage mode is selected, during a decrease delay period of an actual exhaust gas recirculation rate with respect to a target exhaust gas recirculation rate at a time of shifting from the high exhaust gas recirculation rate region to the low exhaust gas recirculation rate region.

In the control device, the electronic control unit may be configured not to control the passage switching valve such that the cooler passing passage mode is selected, until a dew point of a fuel mixture of an intake air and the exhaust gas recirculation gas on the presumption that the cooler passing passage mode is selected after a start of the decrease delay period decreases to a temperature of cooling water or less during the decrease delay period, the cooling water being circulating through the intercooler.

In the control device, the electronic control unit may be configured to estimate the actual exhaust gas recirculation rate based on an engine rotation speed; and the electronic control unit may be configured to estimate the dew point of the fuel mixture based on the actual exhaust gas recirculation rate thus estimated.

A second aspect of the present disclosure relates to a control method for an internal combustion engine. The internal combustion engine includes an ignition device configured to ignite a fuel and air mixture in a cylinder, a supercharger including a compressor provided in an intake passage, an intercooler configured to cool an intake gas compressed by the compressor, an exhaust gas recirculation device including an exhaust gas recirculation passage configured to connect the intake passage on an upstream side relative to the inter cooler to an exhaust passage, a cooler bypass passage connected to the intake passage so as to bypass the intercooler, a passage switching valve configured to switch between a cooler passing passage mode in which the intake gas passes through the intercooler and a cooler bypass passage mode in which the intake gas passes through the cooler bypass passage, and an electronic control unit. The control method includes: controlling, by the electronic control unit, the passage switching valve such that the cooler bypass passage mode is selected while at least part of a high exhaust gas recirculation rate region requesting a high exhaust gas recirculation rate of 25% or more is used; and controlling, by the electronic control unit, the passage switching valve such that the cooler passing passage mode is selected while at least part of a low exhaust gas recirculation rate region requesting a low exhaust gas recirculation rate of less than 25% is used. The high exhaust gas recirculation rate region and the low exhaust gas recirculation rate region are included in an operating region of the internal combustion engine.

In the above configuration, the cooler bypass passage mode is selected while at least part of the high exhaust gas recirculation rate region requesting the high exhaust gas recirculation rate of 25% or more is used, such that the high exhaust gas recirculation rate is used under a high intake gas temperature. Hereby, it is possible to achieve improvement of thermal efficiency by use of the high exhaust gas recirculation rate while balancing restraint of generation of condensed water by use of the high intake gas temperature with restraint of knocking by use of the high exhaust gas recirculation rate. In the meantime, the cooler passing passage mode is selected while at least part of the low exhaust gas recirculation rate region requesting the low exhaust gas recirculation rate of less than 25% is used, such that the low exhaust gas recirculation rate is used under a low intake gas temperature. Hereby, even if a using region within the low exhaust gas recirculation rate region is a heavy load region, it is possible to balance restraint of knocking by use of the low intake gas temperature with restrain of generation of condensed water due to the exhaust gas recirculation rate being zero or low. Thus, it is possible to balance the restraint of knocking with the restraint of generation of condensed water even when either of the high exhaust gas recirculation rate region and the low exhaust gas recirculation rate region is being used. Further, in the above configuration, the passage switching valve that can change an intake-gas flow passage mode between the cooler passing passage mode and the cooler bypass passage mode is used, such that the intake gas temperature can be changed with a high response. Hereby, it is possible to change the intake gas temperature while successfully restraining generation of knocking and condensed water caused due to a delay in change of the intake gas temperature.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is a flowchart illustrating a routine of a process related to the control in Embodiment 3 of the present disclosure.

DETAILED DESCRIPTION OF EMBODIMENTS

With reference to drawings, the following describes embodiments of the present disclosure. Note that, when the number, quantity, amount, range and the like of each element are referred to in the following embodiment, the present disclosure is not limited to the referred number except when particularly explicitly indicated or obviously specified to the number in principle. Moreover, the structures, steps, or the like explained in the following embodiments are not necessarily indispensable to the present disclosure except when particularly explicitly indicated or obviously specified therefor in principle.

First, with reference to FIGS. 1 to 7, the following describes Embodiment 1 of the present disclosure.

Figure 1:
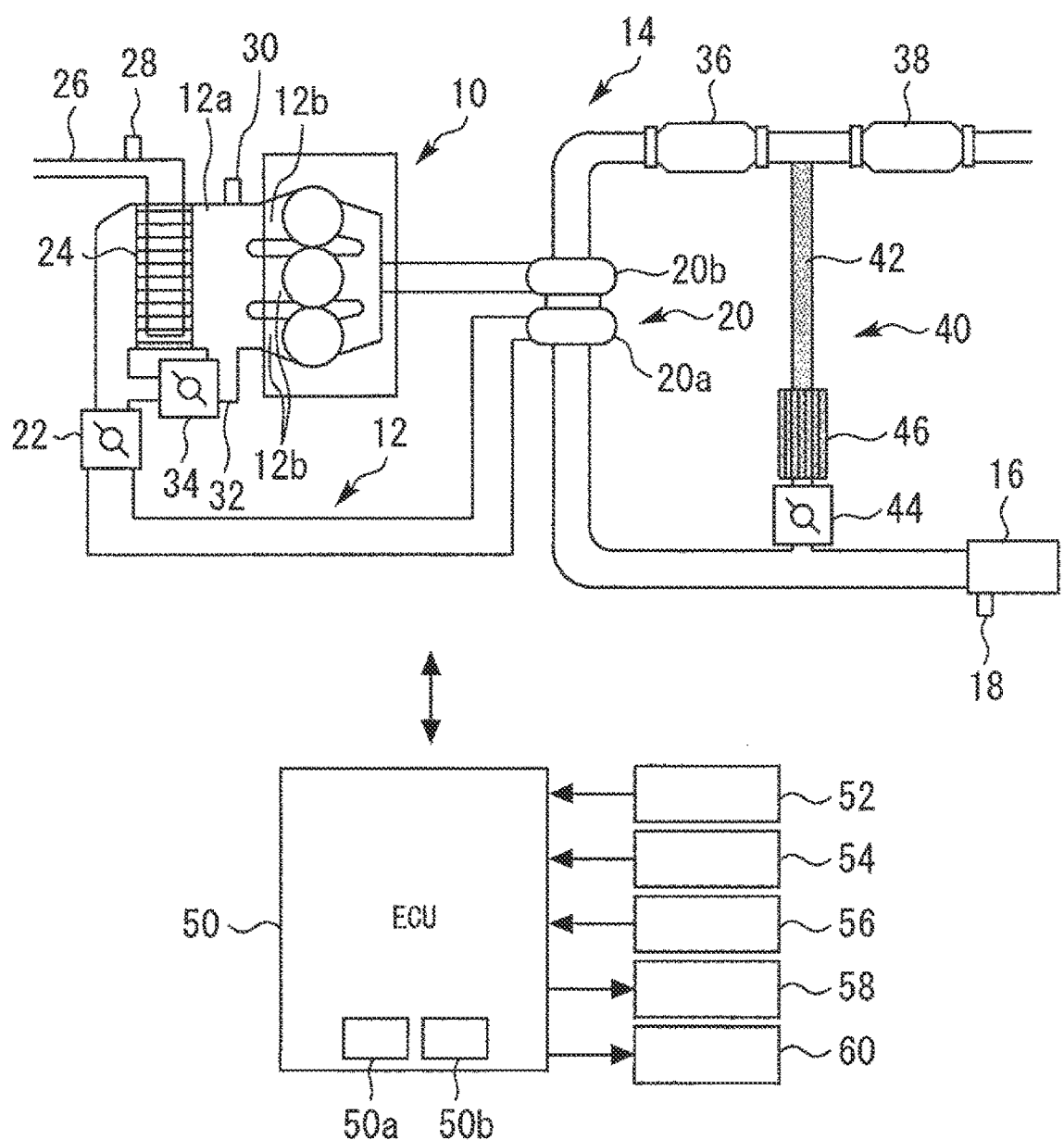
FIG. 1 is a view to describe a system configuration of Embodiment 1 of the present disclosure.

System Configuration in Embodiment 1 FIG. 1 is a view to describe a system configuration of Embodiment 1 of the present disclosure. A system illustrated in FIG. 1 includes a spark-ignition internal combustion engine 10. The internal combustion engine 10 is an in-line three-cylinder engine as an example. An intake passage 12 and an exhaust passage 14 communicate with each cylinder of the internal combustion engine 10.

An air cleaner 16 is attached to a vicinal area of an inlet of the intake passage 12. The air cleaner 16 is provided with an airflow sensor 18 configured to output a signal corresponding to a flow rate of an intake gas (air) flowing through the intake passage 12.

The internal combustion engine 10 includes a turbosupercharger 20 as an example of a supercharger for supercharging an intake air. A compressor 20a of the turbosupercharger 20 is placed in the intake passage 12 on a downstream side relative to the air cleaner 16.

An electronically-controlled throttle valve 22 is provided in the intake passage 12 on the downstream side relative to the compressor 20a. An intake manifold 12a is provided on the downstream side relative to the throttle valve 22. A passage inside the intake manifold 12a functions as a part of the intake passage 12.

In a gathering part (a surge tank) of the intake manifold 12a, an intercooler 24 configured to cool an intake gas compressed by the compressor 20a is placed. The intercooler 24 is a water cooling type, and includes a water pump and a radiator (not shown) as well as a cooling water passage 26 (only partially illustrated in FIG. 1). More specifically, the intercooler 24 is configured such that cooler cooling water having a temperature lower than engine cooling water for cooling an engine main body (at least a cylinder block) circulates through the cooling water passage 26. Note that the intercooler 24 may be placed on an upstream side relative to the throttle valve 22 instead of the above example.

Further, a cooler cooling water temperature sensor 28 configured to detect a temperature of the cooler cooling water circulating through the cooling water passage 26 is attached to the cooling water passage 26. Further, an intake-air temperature sensor 30 is attached to a part of the intake passage 12 on the downstream side relative to the intercooler 24, so as to detect a temperature of an intake gas in that part.

A cooler bypass passage 32 bypassing the intercooler 24 is connected to the intake passage 12. More specifically, as an example, the cooler bypass passage 32 connects a part in the intake passage 12 between the throttle valve 22 and the intercooler 24 to a part of the gathering part of the intake manifold 12a on the downstream side relative to the intercooler 24.

A cooler bypass valve (hereinafter also referred to as an "I/C bypass valve") 34 is placed in the cooler bypass passage 32, as an example of a passage switching valve for switching between a cooler passing passage mode in which the intake gas passes through the intercooler 24 and a cooler bypass passage mode in which the intake gas passes through the cooler bypass passage 32. The I/C bypass valve 34 is configured to open and close the cooler bypass passage 32, and is an electrically driven valve as an example.

When the I/C bypass valve 34 is closed, the intake gas passing through the compressor 20a passes through the intercooler 24 so as to be taken into each cylinder. That is, the "cooler passing passage mode" is implemented. In the meantime, when the I/C bypass valve 34 is opened, the intake gas passing through the compressor 20a passes through the cooler bypass passage 32 so as to be taken into each cylinder. That is, the "cooler bypass passage mode" is implemented. Note that the passage switching valve is not limited to the above configuration of the cooler bypass valve 34, provided that a flow passage is switched between the "cooler passing passage mode" and the "cooler bypass passage mode" as such, and the passage switching valve may be placed on an intake-passage-12 side, for example.

A turbine 20b of the turbosupercharger 20 is placed in the exhaust passage 14. In the exhaust passage 14 on the downstream side relative to the turbine 20b, an upstream catalyst 36 and a downstream catalyst 38 are placed in series for purification of an exhaust gas.

The internal combustion engine 10 illustrated in FIG. 1 includes an EGR device 40. The EGR device 40 includes an EGR passage 42, an EGR valve 44, and an EGR cooler 46. The EGR passage 42 connects the intake passage 12 on the upstream side relative to the intercooler 24 to the exhaust passage 14. More specifically, the EGR passage 42 connects the intake passage 12 on the upstream side relative to the compressor 20a to the exhaust passage 14 on the downstream side relative to the turbine 20b. That is, the EGR device 40 is a low-pressure loop (LPL) system. Further, additionally, the EGR passage 42 is connected to a part in the exhaust passage 14 between the upstream catalyst 36 and the downstream catalyst 38. The EGR valve 44 is an electrically-driven valve as an example, and is provided in the EGR passage 42 so as to open and close the EGR passage 42. The EGR cooler 46 cools an EGR gas flowing through the EGR passage 42.

When the EGR valve 44 is closed, the EGR gas is not introduced into the intake passage 12, so that the "intake gas" passing through the compressor 20a becomes an intake air. In the meantime, when the EGR valve 44 is opened, the "intake gas" passing through the compressor 20a is a fuel mixture of the intake air (fresh air) and the EGR gas. In the EGR device 40, a flow rate of the EGR gas flowing through the EGR passage 42 is controlled by adjusting an opening degree of the EGR valve 44, and as a result, an EGR rate can be controlled. The EGR rate is a ratio of an EGR gas amount relative to an amount of the intake gas (the fuel mixture) flowing into a cylinder.

Further, the system of the present embodiment includes an electronic control unit (ECU) 50. Various sensors and various actuators are electrically connected to the ECU 50.

The various sensors include a crank angle sensor 52 for outputting a signal corresponding to a crank angle, an engine water temperature sensor 54 for outputting a signal corresponding to an engine cooling water temperature, and an accelerator opening sensor 56 for outputting a signal corresponding to a stepping amount (an accelerator opening degree) of an accelerator pedal of a vehicle, in addition to the airflow sensor 18, the cooler cooling water temperature sensor 28, and the intake-air temperature sensor 30 as mentioned above. The ECU 50 can acquire an engine rotation speed by use of the crank angle sensor 52. Further, the above various actuators include a fuel injection valve 58 and an ignition device 60, in addition to the throttle valve 22, the I/C bypass valve 34, and the EGR valve 44 as mentioned above. The fuel injection valve 58 is placed in each cylinder so as to directly inject a fuel into the cylinder. Instead of or in addition to such a cylinder injection valve, the fuel injection valve 58 may be a port injection valve for injecting the fuel into an intake port 12b. The ignition device 60 ignites a fuel/air mixture in the cylinder by use of an ignition plug (not shown) placed in each cylinder.

The ECU 50 includes a processor 50a, a memory 50b, and an input-output interface. The input-output interface takes sensor signals therein from the various sensors, and outputs operation signals to the various actuators. Various control programs and maps for controlling the various actuators are stored in the memory 50b. The processor 50a reads a control program from the memory and executes the control program. Hereby, a function of the present embodiment is implemented.

Figure 2:
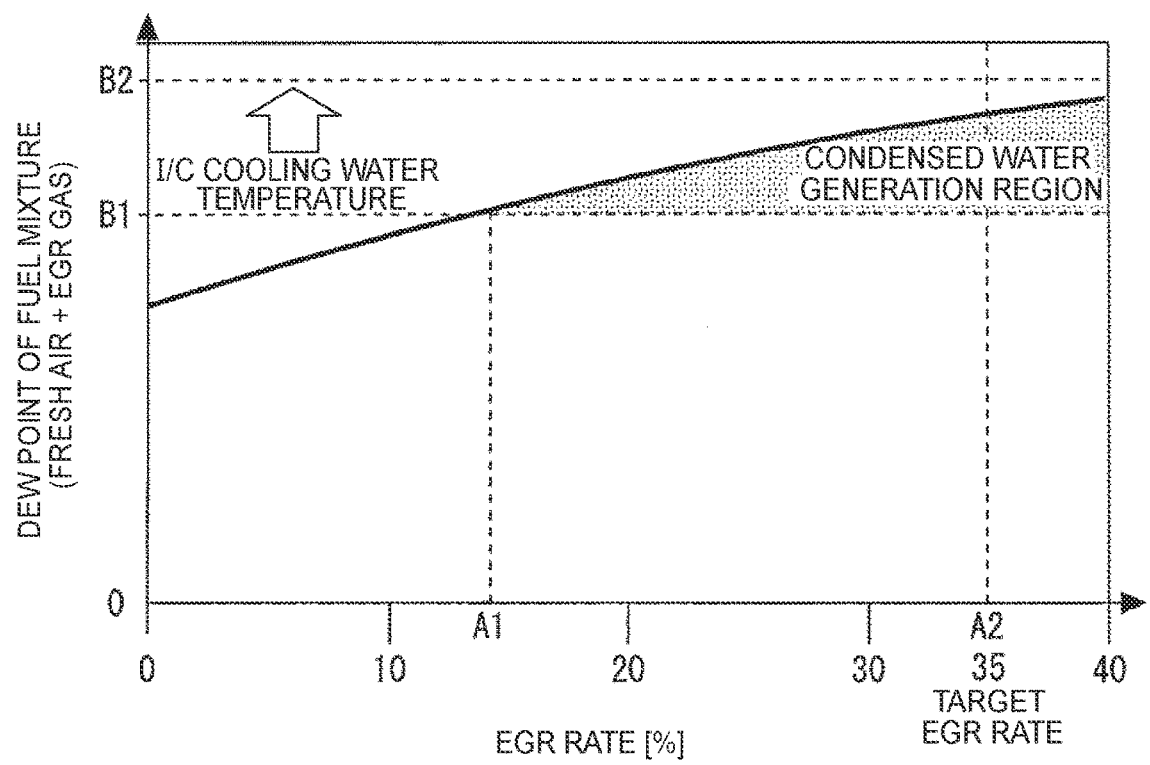
FIG. 2 is a view illustrating a relationship between a dew point of a fuel mixture of an intake air and an EGR gas (that is, an intake gas at the time of introduction of the EGR gas) and an EGR rate.

FIG. 2 is a view illustrating a relationship between a dew point of the fuel mixture of the intake air and the EGR gas (that is, an intake gas at the time when the EGR gas is introduced) and an EGR rate. In order to improve thermal efficiency of the internal combustion engine 10, it is effective to increase the EGR rate. However, in the internal combustion engine 10, when the fuel mixture is cooled in the intercooler 24 to a dew point of the fuel mixture or less, condensed water is generated. In order to prevent a problem such as corrosion of an intake passage wall, it is necessary to restrain generation of condensed water.

More specifically, the dew point of the fuel mixture becomes higher at the EGR rate increases, as illustrated in FIG. 2. When the dew point of the fuel mixture is a temperature of the cooler cooling water (hereinafter also referred to as an "I/C cooling water temperature") or more, condensed water is generated. On this account, in the example illustrated in FIG. 2, in a case where the I/C cooling water temperature is B1, when the EGR rate is not less than an EGR rate A1 at which the dew point of the fuel mixture is equal to the I/C cooling water temperature B1, condensed water is generated. Accordingly, in order to restrain generation of condensed water in a case where a target EGR rate is A2, which is higher than the EGR rate A1, it is necessary to increase the I/C cooling water temperature to a value (e.g., B2) that is higher than the dew point of the fuel mixture at the EGR rate A2, as illustrated in FIG. 2. On the other hand, a temperature of the intake gas (fuel mixture) increases, so that knocking easily occurs in a heavy load region. When an ignition timing is retarded to restrain knocking, thermal efficiency decreases.

New Finding about Use of High EGR Rate For the above reasons, under the common general technical knowledge at the time of filing of the present application, it was difficult to sufficiently increase the EGR rate while balancing restraint of generation of condensed water with restraint of knocking. In this regard, due to diligent studies of the inventor(s) of the present disclosure, the following finding was obtained. That is, it was found that, with the use of a "high EGR rate" of 25% or more, it is possible to improve thermal efficiency even under a high intake gas temperature, while restraining knocking at the same level as a case under a low intake gas temperature.

Figure 3A:
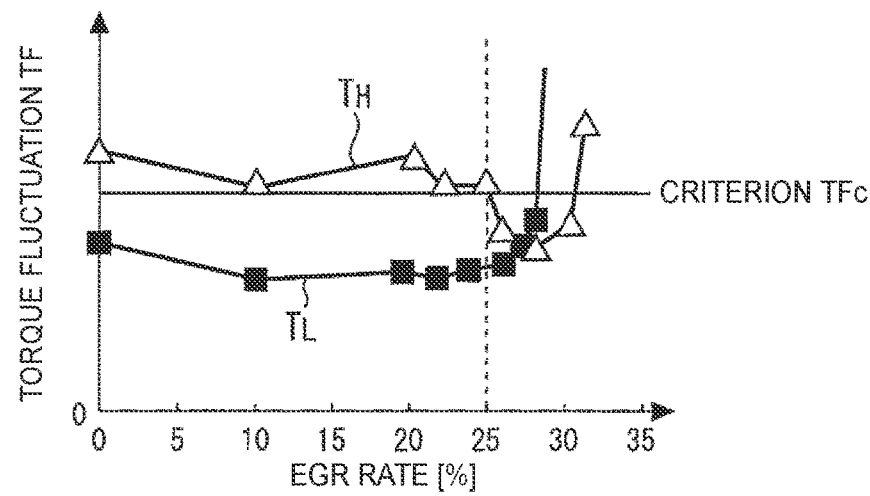
FIG. 3A is a view to describe a relationship between a torque fluctuation TF and the EGR rate in terms of use of a high EGR rate.
Figure 3B:
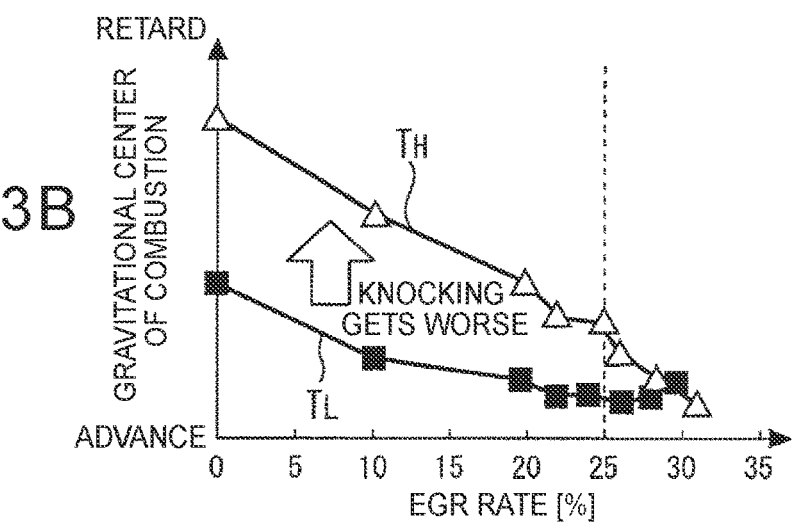
FIG. 3B is a view to describe a relationship between a gravitational center of combustion and the EGR rate in terms of the use of the high EGR rate.
Figure 3C:
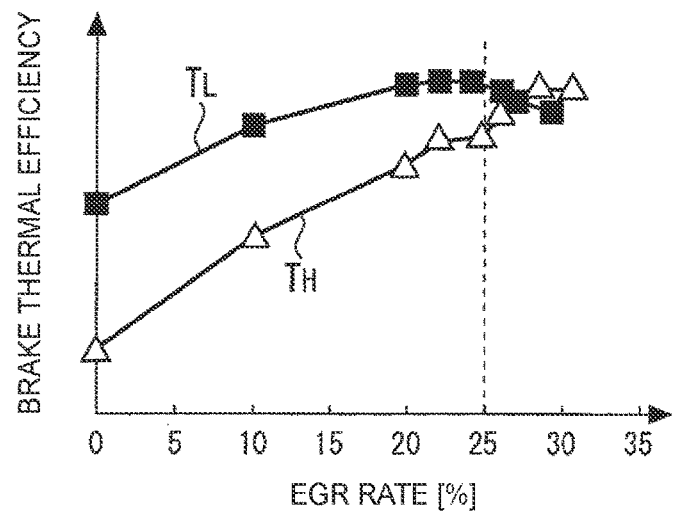
FIG. 3C is a view to describe a relationship between a brake thermal efficiency and the EGR rate in terms of the use of the high EGR rate.

FIGS. 3A, 3B, and 3C are views to describe the finding newly obtained this time in terms of the use of the high EGR rate. More specifically, FIG. 3A illustrates a relationship between a torque fluctuation (an engine torque fluctuation) TF and the EGR rate, FIG. 3B illustrates a relationship between a gravitational center of combustion and the EGR rate, and FIG. 3C illustrates a relationship between a brake thermal efficiency and the EGR rate. Note that the gravitational center of combustion is one example of a representative crank angle position indicating a timing when the combustion is performed, and is a crank angle at the time when a combustion mass ratio (MFB) is 50%.

Further, as an example, FIGS. 3A to 3C show test results obtained at the time when the internal combustion engine 10 is operated under the following conditions: an outside air temperature is 25° C. (a standard environmental temperature); an outside air relative humidity is 100%; an air-fuel ratio is a theoretical air-fuel ratio; and a predetermined low-rotation heavy-load condition is satisfied. This also applies to FIG. 4 (described later).

In each of FIGS. 3A to 3C, two different waveforms having different values of the intake gas temperature (the temperature of the fuel mixture) are illustrated. Out of two intake gas temperatures used herein, one example of a low intake gas temperature $T_L$ is 45° C., and one example of a high intake gas temperature $T_H$ is 75° C. More specifically, the low intake gas temperature $T_L$ corresponds to a temperature value in a case where cooling by the intercooler 24 is used (that is, in a case where the I/C bypass valve 34 is closed), and the high intake gas temperature $T_H$ corresponds to a temperature value in a case where the cooling by the intercooler 24 is not used (that is, in a case where the I/C bypass valve 34 is opened).

A criterion TFc of a torque fluctuation TF illustrated in FIG. 3A corresponds to an upper limit of an acceptable torque fluctuation TF from a viewpoint of good combustion establishment. As illustrated in FIG. 3A, in the waveform of the low intake gas temperature $T_L$ at which knocking can hardly occur in comparison with the high intake gas temperature $T_H$, the torque fluctuation TF is restrained to be low in a range where the EGR rate is 25% or less. From an area where the EGR rate exceeds 25%, the torque fluctuation TF increases along with an increase of the EGR rate, and reaches the criterion TFc at the time when the EGR rate is 28%.

In the meantime, in terms of the waveform of the high intake gas temperature $T_H$ in which knocking relatively easily occurs, the torque fluctuation TF exceeds the criterion TFc due to knocking in a region where the EGR rate is less than 25%. However, due to the diligent studies of the inventor(s) of the present disclosure, the following finding is obtained: as illustrated in FIG. 3A, under the high intake gas temperature $T_H$, when the EGR rate is 25% or more, the torque fluctuation TF decreases to be lower than the criterion TFc by improvement of knocking. The reason why knocking improves as such is presumably because a decrease of a combustion temperature along with the increase of the EGR rate affects knocking. Due to the improvement of knocking, an introduction limit of the EGR rate in the high intake gas temperature $T_H$ improves to 30% from 28% in the low intake gas temperature in the example illustrated in FIG. 3A. That is, in this example, in the high intake gas temperature $T_H$, combustion is established in a range of the EGR rate from 25% to 30%.

The reason why combustion is established in the range of the EGR rate from 25% to 30% in the high intake gas temperature $T_H$ can be also supplemented by FIG. 3B. That is, in a region where the EGR rate is less than 25% in the high intake gas temperature $T_H$, a retard amount of an ignition timing relative to an optimum ignition timing (MBT) for restraint of knocking is large. On this account, as can be seen from comparison between both waveforms in FIG. 3B, in the region where the EGR rate is less than 25%, a retard amount of a gravitational center of combustion is large in the high intake gas temperature $T_H$. When the retard amount of the gravitational center of combustion is large, the combustion is unstable, which leads to an increase of the torque fluctuation TF.

In the meantime, when the EGR rate is 25% or more, the retard amount of the gravitational center of combustion in the high intake gas temperature $T_H$ decreases, as illustrated in FIG. 3B. This is because the retard amount of the ignition timing relative to the MBT can be decreased due to an effect of the decrease of the combustion temperature along with the increase of the EGR rate. More specifically, as illustrated in FIG. 3B, when the EGR rate is 25% or more, a decreasing degree of the retard amount of the gravitational center of combustion relative to the increase of the EGR rate is large in comparison with a region where the EGR rate is less than 25%. In a region where the EGR rate is from 28% to around 30%, an advance of the gravitational center of combustion is enabled to a position equivalent to the low intake gas temperature $T_L$. This leads to improvement of the torque fluctuation TF and improvement of thermal efficiency (improvement of fuel efficiency) as will be described below with reference to FIG. 3C.

As illustrated in FIG. 3C, in a region where the EGR rate is less than 25%, a brake thermal efficiency in the high intake gas temperature $T_H$ is low in comparison with that in the low intake gas temperature $T_L$, due to the retardation of the ignition timing (and the retardation of the gravitational center of combustion along with this) for restraint of knocking, as described above. On the other hand, in a region where the EGR rate is 25% or more, a brake thermal efficiency equivalent to that in the low intake gas temperature $T_L$ is obtained (the fuel efficiency is improved) in the high intake gas temperature $T_H$, due to a decrease of the retard amount of the ignition timing relative to the MBT due to the decrease of the combustion temperature. As such, due to the diligent studies of the inventor(s) of the present disclosure, the following finding was obtained. That is, under the high intake gas temperature $T_H$, when the EGR rate is 25% or more, not only the improvement of knocking, but also the improvement of thermal efficiency (the improvement of fuel efficiency) are achieved as illustrated in FIG. 3C.

Figure 4:
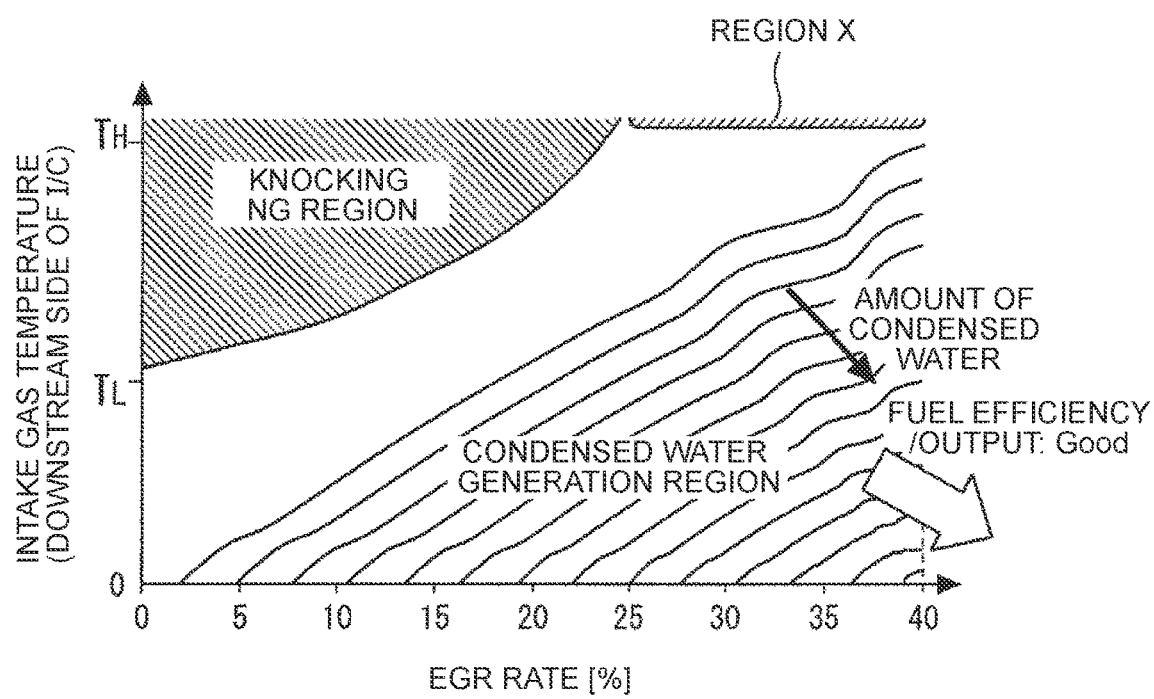
FIG. 4 is a view illustrating a condensed water generation region, a knocking region, and a region X in terms of a relationship between an intake gas temperature (on a downstream side relative to an intercooler) and the EGR rate.

FIG. 4 is a view illustrating a condensed water generation region, a knocking region, and a region X in terms of a relationship between the intake gas temperature (on the downstream side relative to the intercooler 24) and the EGR rate. In terms of the above finding (in a case where the "high EGR rate" of 25% or more is used, it is possible to improve thermal efficiency even under the high intake gas temperature, while restraining knocking at the same level as a case under the low intake gas temperature), a supplementary explanation is made below with reference to FIG. 4.

As illustrated as the condensed water generation region in FIG. 4, as the EGR rate increases, the upper limit of the intake gas temperature at which condensed water is generated increases. More specifically, under the same intake gas temperature, a generation amount of condensed water is larger as the EGR rate is higher. Further, under the same EGR rate, the generation amount of condensed water is larger as the intake gas temperature is lower.

Further, the knocking region illustrated in FIG. 4 corresponds to a region where the torque fluctuation TF exceeds the criterion TFc (see FIG. 3A) due to knocking. Under the same intake gas temperature, the combustion temperature is higher as the EGR rate is lower. On this account, as the EGR rate becomes lower, the knocking region reaches a lower intake gas temperature.

Note that, as illustrated in FIG. 4, a more excellent fuel efficiency (thermal efficiency) and a more excellent engine output can be obtained toward a lower right direction in FIG. 4 (that is, as the intake gas temperature is lower and the EGR rate is higher).

Further, FIG. 4 illustrates examples of an intake gas temperature value (the high intake gas temperature $T_H$ and the low intake gas temperature $T_L$) used in the description of FIGS. 3A to 3C. As described above, the high intake gas temperature $T_H$ corresponds to a temperature value in a case where the cooling by the intercooler 24 is not used (that is, in a case where the I/C bypass valve 34 is opened), and the low intake gas temperature $T_L$ corresponds to an example of a temperature value in a case where the cooling by the intercooler 24 is used (that is, in a case where the I/C bypass valve 34 is closed). Further, additionally, the high intake gas temperature $T_H$ corresponds to a temperature value which is not included in the knocking region under the high EGR rate of 25% or more and at which condensed water is not generated. The low intake gas temperature $T_L$ corresponds to a temperature value which is not included in the knocking region under the EGR rate of 0% and at which condensed water is not generated.

One example of the region corresponding to the above finding can be expressed as a region X in FIG. 4. That is, due to the diligent studies of the inventor(s) of the present disclosure, it was found that, differently from the common general technical knowledge at the time of filing of the present application, a region of the high EGR rate of 25% or more includes the region X in the high intake gas temperature in which knocking can be restrained at the same level as a case under the low intake gas temperature and thermal efficiency can be improved. It was found that, in such region X, if the intake gas (fuel mixture) is not cooled by the intercooler 24, generation of condensed water can be avoided while the thermal efficiency equivalent to that in the low intake gas temperature is maintained.

As described above, the region X where thermal efficiency can be improved while the restraint of knocking is balanced with the restraint of generation of condensed water exists on a high-EGR-rate side and on a high-intake-gas-temperature side. However, the high intake gas temperature $T_H$ included in the region X cannot be employed in the low EGR rate region where the EGR rate is less than 25%. The reason is as follows: when the EGR rate is decreased under the high intake gas temperature $T_H$, combustion is not established under the influence of knocking, as understood from FIGS. 3A and 4, and further, an engine output decreases because a large retardation of the ignition timing is requested as illustrated in FIG. 3B.

Accordingly, in the internal combustion engine 10 in which the EGR gas is introduced into the upstream side of the intercooler 24 and the high EGR rate of 25% or more and the low EGR rate of less than 25% (including zero) are used as the target EGR rate, in order to increase the EGR rate and improve thermal efficiency while the finding is used, it is necessary for the intake gas temperature (the fuel mixture temperature) to be changed depending on a requested EGR rate (that is, the target EGR rate).

Figure 6:
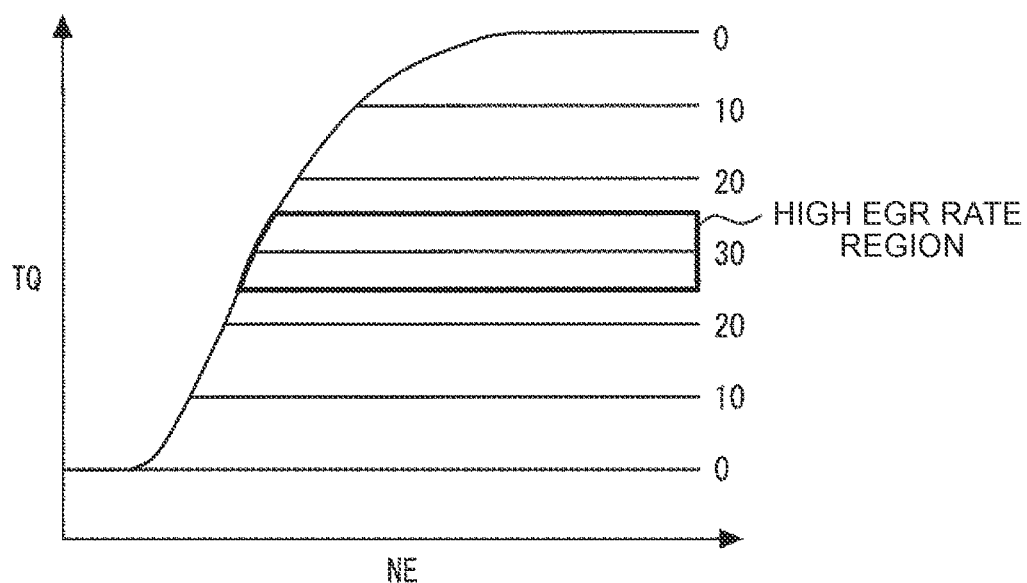
FIG. 6 is a graph illustrating an example of setting of a large EGR map.
Figure 7:
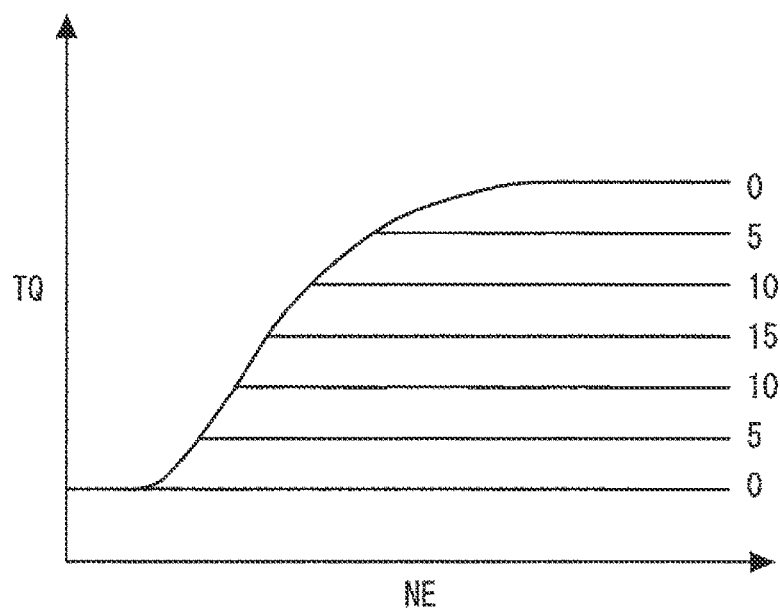
FIG. 7 is a graph illustrating an example of setting of a small EGR map.

During the operation of the internal combustion engine 10, an engine operating point on an engine operating region, specified by an engine load and an engine rotation speed, is changed frequently due to a request of acceleration or deceleration from a driver of the vehicle. The target EGR rate is changed depending on the engine operating region as illustrated in FIGS. 6 and 7 (described later). Accordingly, the target EGR rate also changes frequently when the engine operating point is changed frequently.

Here, as illustrated in FIGS. 3A to 3C, a range of the high EGR rate of 25% or more (a range of the EGR rate within the region X in FIG. 4), corresponding to the above finding, is small. On this account, as illustrated in FIGS. 3A and 4, when the EGR rate becomes slightly lower than the "high EGR rate" under the high intake gas temperature $T_H$, an increase of the torque fluctuation TF due to knocking occurs. On this account, in a case where a decrease of the intake gas temperature is delayed relative to a decrease of the EGR rate from the "high EGR rate," knocking easily occurs. Further, conversely, in a case where a decrease of the intake gas temperature is delayed relative to an increase of the EGR rate from the low EGR rate of less than 25%, condensed water is generated. Accordingly, it is necessary to perform the change of the intake gas temperature immediately.

In the present embodiment, in a case where an engine operating region requesting the "high EGR rate" of 25% more than (hereinafter also referred to as a "high EGR rate region") is requested, the EGR device 40 is controlled so that a target EGR rate of 25% more than is obtained (more specifically, an opening degree of the EGR valve 44 is controlled). In the meantime, in a case where an engine operating region requesting the EGR rate of less than 25% (hereinafter also referred to as a "low EGR rate region") is requested, the EGR device 40 is controlled so that a target EGR rate of less than 25% is obtained.

After that, during the use of the high EGR rate region, the I/C bypass valve 34 is opened. In the meantime, during the use of the low EGR rate region, the I/C bypass valve 34 is closed.

Figure 5:
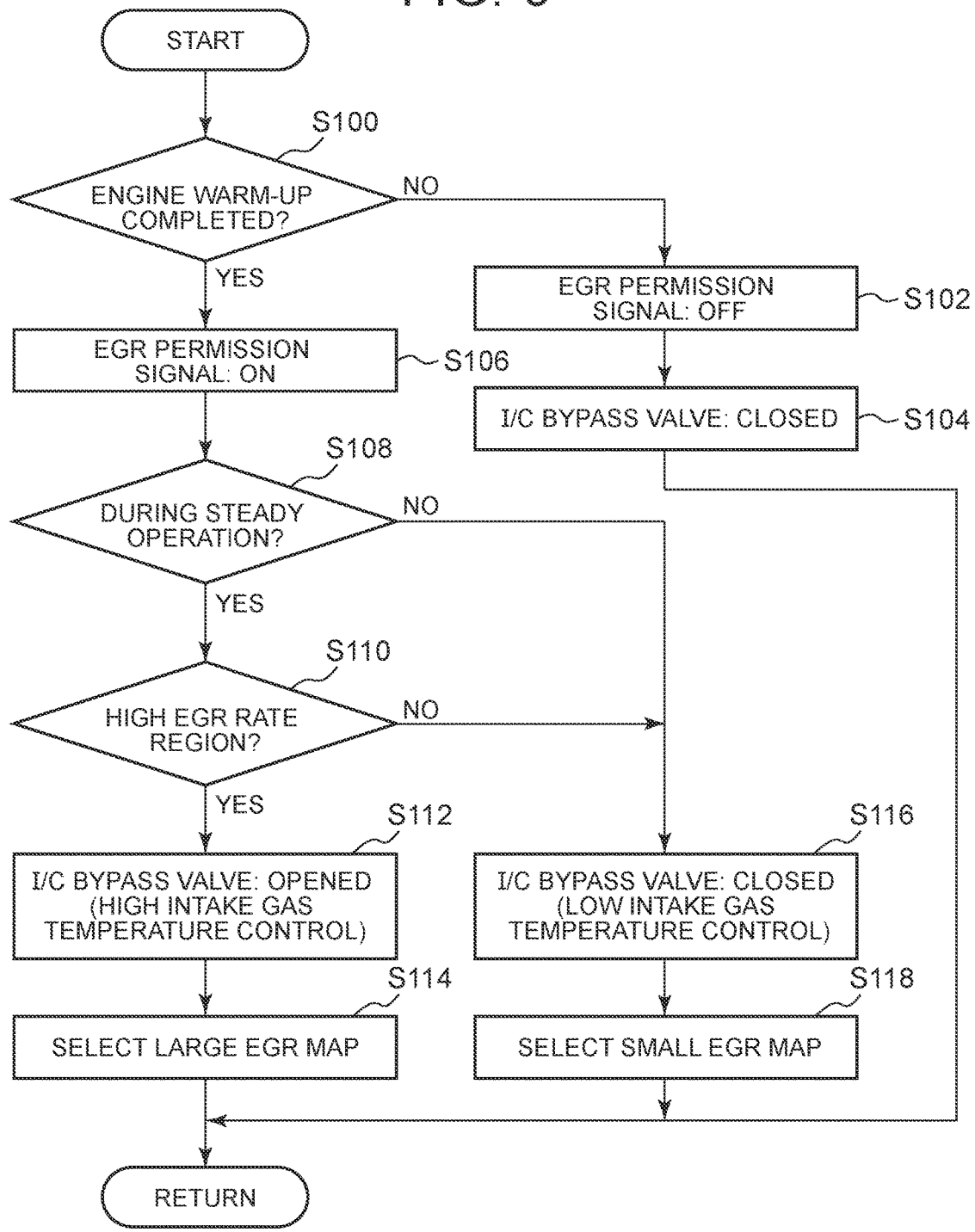
FIG. 5 is a flowchart illustrating a routine of a process related to a control in Embodiment 1 of the present disclosure.

FIG. 5 is a flowchart illustrating a routine of a process related to the control in Embodiment 1 of the present disclosure. Note that this routine is performed repeatedly at a predetermined control period during the operation of the internal combustion engine 10.

In the routine of FIG. 5, the ECU 50 first determines whether engine warm-up is completed or not (step S100). More specifically, whether the engine warm-up is completed or not can be determined based on whether or not an engine cooling water temperature detected by use of the engine water temperature sensor 54 is a predetermined determination temperature (e.g., 60° C.) or more.

When it is determined that the engine warm-up is not completed in step S100, the ECU 50 turns off an EGR permission signal to permit introduction of the EGR gas (step S102). Further, in this case, the ECU 50 closes the I/C bypass valve 34 (step S104).

In the meantime, when it is determined that the engine warm-up is completed in step S100, the ECU 50 turns on the EGR permission signal (step S106). Subsequently, the ECU 50 determines whether or not the internal combustion engine 10 is during a steady operation (step S108). More specifically, whether the internal combustion engine 10 is during the steady operation or during a transient operation can be determined based on whether a time change rate of an engine load factor or a time change rate of an engine rotation speed is a predetermined value or not, for example.

When it is determined that the internal combustion engine 10 is during the steady operation, the ECU 50 then determines whether or not a current engine operating point is in the high EGR rate region (step S110). As described above, the high EGR rate region is an engine operating region where the high EGR rate of 25% or more is requested (that is, a large-EGR-introduction EGR region), and is specified by an engine torque TQ and an engine rotation speed NE.

The current engine operating point in the engine operating region can be specified by a current engine torque TQ and a current engine rotation speed NE. The ECU 50 stores therein a map (see FIG. 6 (described later)) in which the high EGR rate region is specified in connection with the engine torque TQ and the engine rotation speed NE. On this account, in step S110, by referring to the current engine torque TQ, the current engine rotation speed NE, and the above map, it is determined whether or not the current engine operating point falls within the high EGR rate region. Note that the engine torque TQ can be calculated based on an engine rotation speed NE acquired by use of the crank angle sensor 52, an engine load factor, and an ignition timing. The engine load factor can be calculated based on an intake-air amount acquired by use of the airflow sensor 18 and the engine rotation speed NE, for example.

When it is determined that the current engine operating point falls within the high EGR rate region in step S110, that is, when the high EGR rate region is requested, the ECU 50 performs a process of opening the I/C bypass valve 34 (step S112). As a result, the intake gas (the fuel mixture) bypasses the intercooler 24, so that the high intake gas temperature $T_H$ is obtained.

When the determination in step S110 is established, the ECU 50 further performs a process of step S114. In step S114, a large EGR map is selected for an EGR rate control. The large EGR map is a map for the EGR rate used when the I/C bypass valve 34 is opened.

FIG. 6 is a graph illustrating an example of setting of the large EGR map. As illustrated in FIG. 6, in the large EGR map, a target EGR rate at each engine operating point is set in connection with the engine torque TQ and the engine rotation speed NE. More particularly, in the large EGR map, as illustrated in FIG. 6, a partial load region (more specifically, a middle load region (except a low rotation region) is set as a high EGR rate region with the EGR rate of 25% or more. In step S114, the target EGR rate in the high EGR rate region is acquired as a value corresponding to the current engine torque TQ and the current engine rotation speed NE. As a result, an opening degree of the EGR valve 44 is controlled so that the target EGR rate thus acquired is obtained.

Note that, in the large EGR map, a target EGR rate in an engine operating region other than the high EGR rate region is also set although not used in the process of step S114. That is, as illustrated in FIG. 6, in terms of engine operating points on a high-torque (heavy-load) side relative to the high EGR rate region, the target EGR rate becomes lower as the engine torque TQ increases. Further, in terms of engine operating points on a low-torque (light-load) side relative to the high EGR rate region, the target EGR rate becomes lower as the engine torque TQ becomes lower. Further, as illustrated in FIG. 6, the target EGR rate is zero in a low-rotation-speed region and a light load region of not more than a predetermined engine torque, including an idling operation time.

In the meantime, when it is determined that the internal combustion engine 10 is during the transient operation in step S108, or when it is determined that the current engine operating point does not fall within the high EGR rate region in step S110, the ECU 50 performs processes of step S116 and S118.

In step S116, the ECU 50 performs a process of closing the I/C bypass valve 34. As a result, the intake gas (the fuel mixture) passes through the intercooler 24, so that the low intake gas temperature $T_L$ is obtained.

In step S118, the ECU 50 selects a small EGR map for the EGR rate control. The small EGR map is a map for the EGR rate used when the I/C bypass valve 34 is closed.

FIG. 7 is a graph illustrating an example of setting of the small EGR map. As illustrated in FIG. 7, similarly to the large EGR map, in the small EGR map, a target EGR rate at each engine operating point is set in connection with the engine torque TQ and the engine rotation speed NE. Note that, in the small EGR map, as can be seen from comparison of FIG. 7 with FIG. 6, the engine operating region where the EGR gas is introduced (that is, a region where the target EGR rate is other than zero) is small, and a maximum value of the target EGR rate is also small, in comparison with the large EGR map. In step S118, the target EGR rate is acquired as a value corresponding to the current engine torque TQ and the current engine rotation speed NE by referring to the small EGR map. As a result, the opening degree of the EGR valve 44 is controlled so that the target EGR rate thus acquired is obtained.

According to the process of the routine illustrated in FIG. 5, during the steady operation, the I/C bypass valve 34 is switched between opening and closing based on whether the requested EGR rate is the "high EGR rate (25% or more)" or not.

More specifically, while the high EGR rate region where a large amount of the EGR gas can be introduced is used during the steady operation, the I/C bypass valve 34 is opened and the large EGR map is selected. Hereby, the high EGR rate is used under the high intake gas temperature $T_H$. As a result, it is possible to achieve the improvement of thermal efficiency by use of the high EGR rate while balancing restraint of generation of condensed water by use of the high intake gas temperature $T_H$ and restraint of knocking by use of the high EGR rate.

Further, while the low EGR rate region (including a region with an EGR rate of zero) is used during the steady operation, the I/C bypass valve 34 is closed and the small EGR map is selected. Hereby, the low EGR rate is used under the low intake gas temperature $T_L$. As a result, even in the heavy load region where the high EGR rate cannot be used from a viewpoint of securing of an engine output, it is possible to balance restraint of knocking and securing of an engine output by use of the low intake gas temperature $T_L$, with restrain of generation of condensed water due to the EGR rate being zero or low.

On this account, by the control of the present embodiment, in the internal combustion engine 10 configured such that the EGR gas is introduced into the intake passage 12 on the upstream side relative to the intercooler 24 and the high EGR rate of 25% or more is used to improve thermal efficiency, it is possible to balance the restraint of knocking with the restraint of generation of condensed water even when either of the high EGR rate region and the low EGR rate region is used.

By the intake gas temperature control by opening and closing of the I/C bypass valve 34, the intake gas temperature can be changed between the high intake gas temperature $T_H$ and the low intake gas temperature $T_L$ immediately in comparison with a case where the intake gas temperature is changed by using the adjustment of the I/C cooling water temperature, for example. Further, a length of the cooler bypass passage 32 is sufficient if the cooler bypass passage 32 can bypass the intercooler 24. On this account, the length of the cooler bypass passage 32 can be shortened easily in comparison with the LPL-type EGR device 40 in which a passage length from an EGR gas inlet to a cylinder is long because the EGR gas inlet is placed on the upstream side relative to the compressor 20a. That is, with a cooler bypass mechanism (the cooler bypass passage 32 and the cooler bypass valve (I/C bypass valve) 34), it is possible to easily obtain a configuration to change the intake gas temperature with a higher response than a change of the EGR rate by the EGR device 40. Accordingly, with the use of such a cooler bypass mechanism, even if the target EGR rate may frequently change between the high EGR rate of 25% or more and the low EGR rate of less than 25% along with frequent changes of the engine operating region during the operation of the internal combustion engine 10, it is possible to successfully restrain generation of knocking and generation of condensed water caused due to a delay in change of the intake gas with respect to a change of an actual EGR rate.

Further, as described above, in comparison with the cooler bypass mechanism that can easily realize an immediate change of the intake gas temperature, a response delay easily occurs in the change of the EGR rate by the EGR device 40. On this account, when an increase of the actual EGR rate to a high EGR rate in response to a change to the high intake gas temperature $T_H$ delays, knocking easily occurs. On the other hand, when a decrease of the actual EGR rate to a low EGR rate in response to a change to the low intake gas temperature $T_L$ delays, condensed water is generated. In this regard, in the process of the routine, during the transient operation, the I/C bypass valve 34 is closed regardless of the engine operating region to be used (in other words, the opening of the I/C bypass valve 34 is forbidden), and the small EGR map is selected (in other words, the use of the large EGR map is forbidden). This makes it possible to surely restrain knocking from easily occurring due to a delay in increase of the actual EGR rate to the high EGR rate in response to the change to the high intake gas temperature $T_H$. Note that, the process related to such a transient operation does not restrain generation of condensed water caused due to a delay in decrease of the actual EGR rate to the low EGR rate in response to the change to the low intake gas temperature $T_L$, but it may be said that this process makes it possible to take a measure to restrain knocking in preference to restraint of generation of condensed water to be temporarily generated during the transient operation.

Further, in the process of the routine, when the introduction of the EGR gas is not permitted because the engine warm-up is not completed, the I/C bypass valve 34 is closed. Hereby, it is possible to achieve restraint of knocking under a state where knocking easily occurs because the EGR gas is not introduced.

In the meantime, Embodiment 1 described above deals with an example in which the I/C bypass valve 34 is opened (that is, the "cooler bypass passage mode" is selected) in the entire high EGR rate region with the EGR rate of 25% or more, while the I/C bypass valve 34 is closed (that is, the "cooler passing passage mode" is selected) in the entire low EGR rate region with the EGR rate of less than 25%. However, the control of the passage switching valve (e.g., the I/C bypass valve 34) of the present disclosure is not limited to the above example. That is, the passage switching valve may be controlled so that the cooler bypass passage mode is selected at the time when not the entire high EGR rate region, but a given part thereof is being used, and the cooler passing passage mode is selected at the time when not the entire low EGR rate region, but a given part thereof is being used.

Further, additionally, for example, within the high EGR rate region, the passage switching valve may be controlled such that the cooler bypass passage mode is selected at the time when an EGR rate region of a first specific EGR rate value or more is used, the first specific EGR rate value being an EGR rate of 25% or more, and within the low EGR rate region, the passage switching valve may be controlled such that the cooler passing passage mode is selected at the time when an EGR rate region of less than a second specific EGR rate value is used, the second specific EGR rate value being an EGR rate of 25% or less. More specifically, in the above exemplary control, when the first specific EGR rate value is 25%, the "cooler bypass passage mode" is selected in the entire high EGR rate region, similarly to Embodiment 1, and when the first specific EGR rate value is higher than 25%, the "cooler bypass passage mode" is selected during the use of a part of the EGR rate region on a high-EGR-rate side within the high EGR rate region. Further, in the above exemplary control, when the second specific EGR rate value is 25%, the "cooler passing passage mode" is selected in the entire low EGR rate region, similarly to Embodiment 1, and when the second specific EGR rate value is lower than 25%, the "cooler passing passage mode" is selected during the use of a part of the EGR rate region on a low-EGR-rate side within the low EGR rate region.

Next will be described Embodiment 2 of the present disclosure with reference to FIGS. 8 and 9.

System Configuration in Embodiment 2 In the following description, the configuration illustrated in FIG. 1 is used as an example of a system configuration of Embodiment 2.

As described in Embodiment 1, a change of the actual EGR rate with respect to a change of the target EGR rate delays during the transient operation. In the LPL-type EGR device 40 having a long passage length from the EGR gas inlet to the cylinder, such a delay is large.

The present embodiment is targeted for an example in which the low EGR rate region is shifted to the high EGR rate region at the time of a transient operation along with an acceleration request (hereinafter referred to as "acceleration transition"). In this example, the actual EGR rate becomes insufficient with respect to the target EGR rate because of the delay. Meanwhile, a change of the intake gas temperature by a cooler bypass mechanism is quick. Accordingly, when the I/C bypass valve 34 is opened immediately with disregard to the delay, in response to a request of the high EGR rate region at the time of acceleration, the high intake gas temperature $T_H$ is used under the "low EGR rate" of less than 25%. As a result, knocking easily occurs.

Further, the delay in change of the actual EGR rate varies depending on an acceleration pattern (specifically, rise or fall of the engine rotation speed NE during acceleration). This is because a delay period of the actual EGR rate is short when the engine rotation speed NE is high. When the low intake gas temperature $T_L$ is kept being used though the delay of the actual EGR rate is eliminated, condensed water is generated under the "high EGR rate" of 25% or more. Accordingly, it is desirable that a measure to the delay in change of the actual EGR rate be made in consideration of the acceleration pattern (rise or fall of the engine rotation speed NE during acceleration). Note that the rise or fall of the engine rotation speed NE during acceleration depends on rise or fall of the engine rotation speed NE at the start of acceleration, and further, also depends on a stepping speed of an accelerator pedal at the time of acceleration. This is because, when the stepping speed of the accelerator pedal is high, the engine rotation speed increases early.

Figure 8:
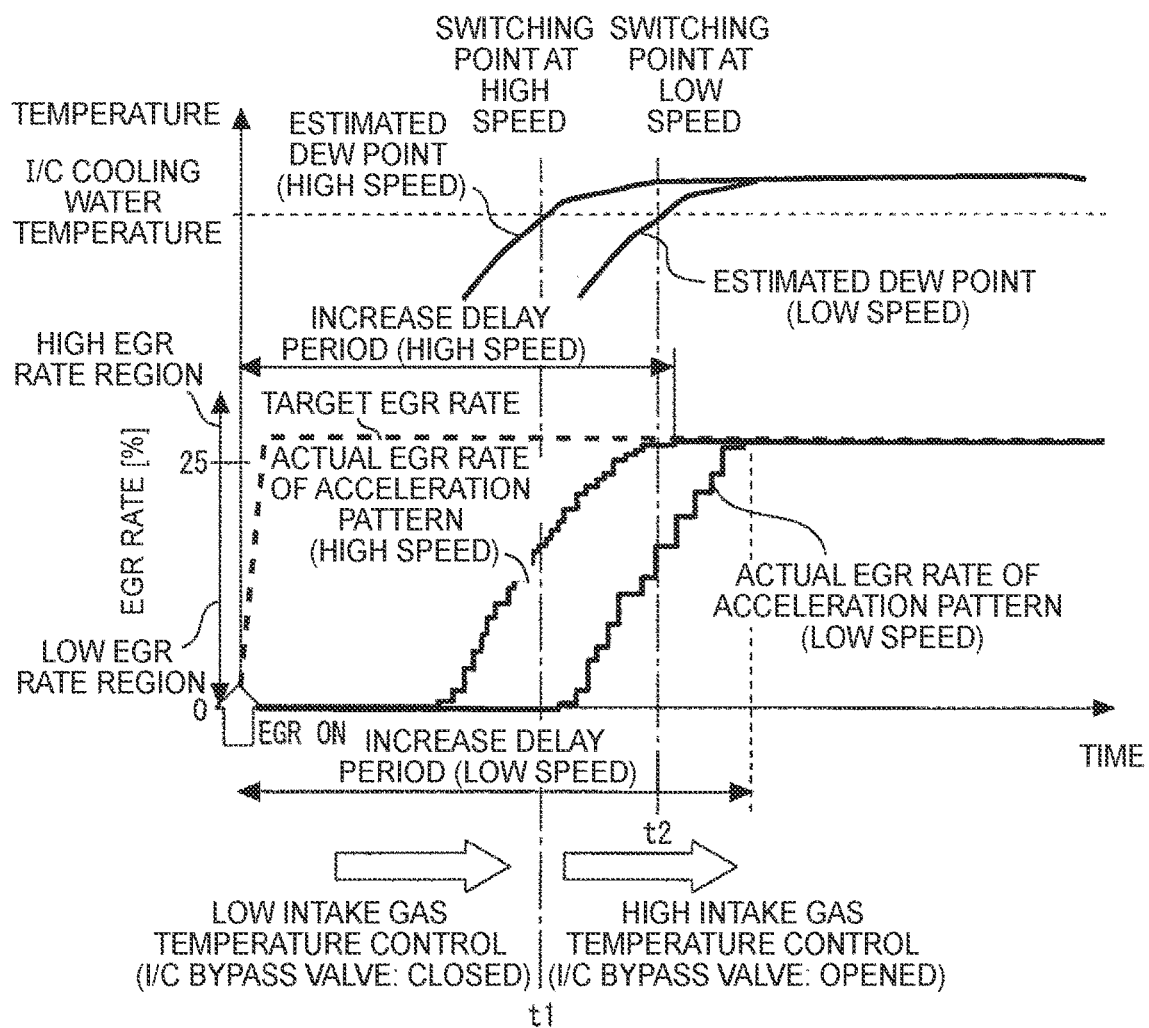
FIG. 8 is a time chart to describe a control at the time of acceleration transition in Embodiment 2 of the present disclosure.

FIG. 8 is a time chart to describe a control at the time of acceleration transition in Embodiment 2 of the present disclosure. FIG. 8 illustrates transitions of the actual EGR rate in two acceleration patterns using different engine rotation speeds NE, that is, in an acceleration pattern (low speed) and in an acceleration pattern (high speed). Those two exemplary acceleration patterns are examples in which the same "high EGR rate" in the high EGR rate region is set as a target EGR rate.

As illustrated in FIG. 8, the target EGR rate increases immediately along with stepping of the accelerator pedal. On the other hand, the actual EGR rate has the above delay. More specifically, an increase delay period of the actual EGR rate in the acceleration pattern (low speed) is longer than that in the acceleration pattern (high speed).

In the present embodiment, during an increase delay period of the actual EGR rate at the time of acceleration transition that requests the high EGR rate region like the example illustrated in FIG. 8 (a period during which the target EGR rate is higher than the actual EGR rate), the following control is performed. That is, the actual EGR rate during an acceleration transient operation is estimated based on the engine rotation speed NE. A dew point of the intake gas (the fuel mixture of the intake air and the EGR gas) during the acceleration transient operation is estimated based on an estimated value (an estimated EGR rate) of the actual EGR rate.

In FIG. 8, an estimated dew point based on the above technique is illustrated for each acceleration pattern. The estimated dew point increases over time in accordance with the actual EGR rate that increases with an increase delay as illustrated in FIG. 8. When the dew point of the intake gas increases to an I/C cooling water temperature or more, the intake gas is cooled by the intercooler 24, which might generate condensed water.

In view of this, in the present embodiment, when the estimated dew point increases to the I/C cooling water temperature or more during the increase delay period of the actual EGR rate, switching of the I/C bypass valve 34 (that is, switching from closing to opening) is performed.

Further, in the present embodiment, in a case where a torque fluctuation TF is higher than a predetermined determination value during the increase delay period after the I/C bypass valve 34 is opened along with the increase of the estimated dew point to the I/C cooling water temperature or more, the ignition device 60 is controlled so that an ignition timing is retarded.

Figure 9:
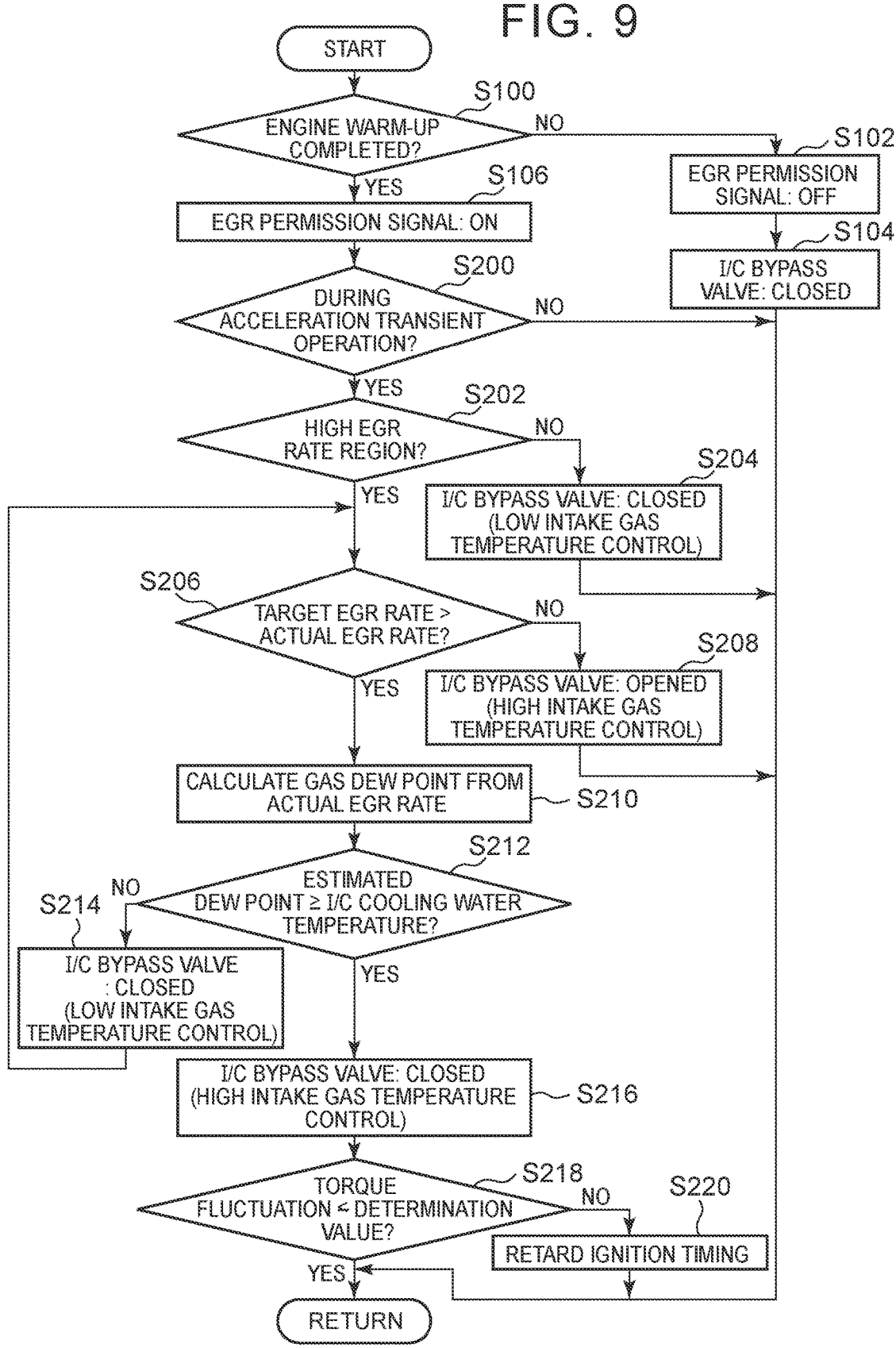
FIG. 9 is a flowchart illustrating a routine of a process related to the control in Embodiment 2 of the present disclosure.

Process of ECU related to Control of Intake Gas Temperature and EGR Rate in Embodiment 2 FIG. 9 is a flowchart illustrating a routine of a process related to a control in Embodiment 2 of the present disclosure. Processes of steps S100 to S106 in the routine illustrated in FIG. 9 have been already described in Embodiment 1.

In the routine of FIG. 9, when the EGR permission signal is turned on after the engine warm-up is completed in step S106, the ECU 50 proceeds to step S200. In step S200, the ECU 50 determines whether or not the acceleration transient operation from a light load condition using the low EGR rate region is being performed. This determination can be performed based on a current magnitude of an opening degree of the throttle valve 22 and whether or not an increasing amount of the opening degree is a predetermined determination value or more, for example.

When it is determined that the acceleration transient operation is not been performed in step S200, the ECU 50 finishes a present processing cycle of this routine. Note that, after it is determined that the acceleration transient operation is not being performed, processes of (that is, a process for the steady operation) of step S108 and its subsequent steps of the routine illustrated in FIG. 5 may be performed.

In the meantime, when it is determined that the acceleration transient operation is being performed in step S200, the ECU 50 determines whether the high EGR rate region (a large-EGR introduction region) is requested or not (step S202). Like the map illustrated in FIG. 6, a target EGR rate to be used at the time when the I/C bypass valve 34 is opened is stored in the ECU 50 in connection with the engine torque TQ and the engine rotation speed NE. In step S202, since the transient operation is being performed, a currently requested engine operating point is specified by use of a target engine torque TQr determined depending on the accelerator opening degree and the engine rotation speed NE. Then, it is determined whether the high EGR rate region is requested or not based on whether or not the target EGR rate corresponding to the engine operating point is 25% or more.

In a case where it is determined that the high EGR rate region is not requested in step S202, the ECU 50 performs (continues) a process of closing the I/C bypass valve 34 and continuously selects the small EGR map (step S204). In the meantime, in a case where it is determined that the high EGR rate region is requested in step S202, the ECU 50 then proceeds to step S206.

In step S206, the ECU 50 determines whether the target EGR rate is higher than an actual EGR rate or not. The actual EGR rate during the acceleration transient operation is estimated based on the engine rotation speed NE as described above. More specifically, a time required after the opening degree of the EGR valve 44 is changed but before the actual EGR rate reaches the target EGR rate can be grasped based on the engine rotation speed NE and a passage length from the EGR inlet to the cylinder. Further, a value of the actual EGR rate at each time point in a course where the actual EGR rate reaches the target EGR rate can be acquired by the following technique, for example. That is, a relationship between the value of the actual EGR rate at each time point and parameters such as an elapsed time from a time point when the opening degree of the EGR valve 44 is changed, opening degrees of the EGR valve 44 before and after the change, an intake-air amount based on a detection value of the airflow sensor 18, and the engine rotation speed NE is determined in advance by experiment and the like, and a map that defines the relationship is stored in the ECU 50. The determination in step S206 is performed by use of the actual EGR rate during the acceleration transient operation, the actual EGR rate being estimated based on the parameters such as the engine rotation speed NE, by referring to such a map.

In a case where the determination in step S206 is not established, that is, in a case where the actual EGR rate reaches the target EGR rate, the ECU 50 performs a process of opening the I/C bypass valve 34 and selects the large EGR map (step S208).

In the meantime, in a case where the determination in step S206 is established, that is, in a case where it is during the increase delay period of the actual EGR rate, the ECU 50 calculates an estimated value of the dew point (that is, an estimated dew point) of the intake gas (fuel mixture) based on parameters such as an estimated value of the actual EGR rate (step S210). More specifically, the estimated dew point can be calculated based on parameters such as the estimated value of the actual EGR rate used in step S206, an intake gas temperature on the downstream side of the intercooler 24 based on a detection value of the intake-air temperature sensor 30, and an intake-air amount based on a detection value of the airflow sensor 18, for example. Further, additionally, in the present embodiment, the intake gas temperature used for the calculation of the estimated dew point is a "current intake gas temperature" during the increase delay period, as described above. Accordingly, by the process of step S210, an "estimated dew point of a current intake gas temperature" during the increase delay period is calculated.

Subsequently to the process of step S210, the ECU 50 determines whether or not the estimated dew point is the I/C cooling water temperature or more (step S212). As a result, when the determination is not established, that is, when it can be determined that condensed water is not generated under the low intake gas temperature $T_L$ along with cooling of the intake gas by the intercooler 24, the ECU 50 proceeds to step S214. In step S214, the process of closing the I/C bypass valve 34 is performed (continued), and the small EGR map is selected continuously.

In the meantime, when the estimated dew point increases to the I/C cooling water temperature or more, that is, when it can be determined that condensed water would be generated if the low intake gas temperature $T_L$ is kept being used, the ECU 50 proceeds to step S216. In step S216, the ECU 50 performs a process of opening the I/C bypass valve 34 and selects the large EGR map.

Further, subsequently to the process of step S216, the ECU 50 determines whether or not the torque fluctuation TF is a determination value (e.g., the criterion TFc illustrated in FIG. 3A) or less (step S218). For example, the torque fluctuation TF can be calculated by use of an output value of the crank angle sensor 52. Note that, in a hybrid vehicle including the internal combustion engine 10 and an electric motor as power sources, when the electric motor has a configuration that can detect the torque fluctuation TF, the torque fluctuation TF may be acquired by use of such a configuration.

When it is determined that the torque fluctuation TF is the determination value or less in step S218, the ECU 50 finishes a present processing cycle of this routine. In the meantime, when the torque fluctuation TF is higher than the determination value, the ECU 50 retards the ignition timing so as to decrease the torque fluctuation TF (step S220). More particularly, for example, the ignition timing is retarded only by a predetermined amount.

In the control of Embodiment 1, when the transient operation to shift from the low EGR rate region to the high EGR rate region is performed, the I/C bypass valve 34 is closed (that is, the opening of the I/C bypass valve 34 is forbidden) and the small EGR map is used until it is determined that the steady operation is being performed after the high EGR rate region is achieved.

On the other hand, in the process of the routine illustrated in FIG. 9, in the increase delay period (the target EGR rate>the actual EGR rate) during the acceleration transient operation to shift from the low EGR rate region to the high EGR rate region, the I/C bypass valve 34 is closed (that is, the opening of the I/C bypass valve 34 is forbidden) while the estimated dew point is lower than the I/C cooling water temperature, and the small EGR map is used. With such a control, during a period in which the estimated dew point increases to the I/C cooling water temperature or more, that is, during an initial period in which the actual EGR rate is relatively low during the increase delay period, it is possible to restrain knocking from easily occurring by use of the high intake gas temperature $T_H$.

Further, in the process of the routine, after the estimated dew point increases to the I/C cooling water temperature or more, the I/C bypass valve 34 is opened and the large EGR map is used. This makes it possible to restrain generation of knocking and condensed water appropriately and to switch the I/C bypass valve 34. More specifically, it is possible to achieve restraint of knocking by delaying opening of the I/C bypass valve 34 just before condensed water is generated along with the increase of the actual EGR rate during the increase delay period, and it is possible to restrain generation of condensed water by use of the high intake gas temperature $T_H$ by opening the I/C bypass valve 34 before condensed water starts to be generated.

Further, additionally, as described above, the actual EGR rate is estimated in consideration of the influence of the engine rotation speed NE. On this account, the estimated dew point calculated based on the estimated value of the actual EGR is also calculated in consideration of the influence of the engine rotation speed NE (that is, a point where the increase delay period of the actual EGR rate changes depending on rise or fall of the engine rotation speed NE). Accordingly, by switching the I/C bypass valve 34 by use of the estimated dew point, a timing when the estimated dew point reaches the I/C cooling water temperature comes earlier at the time of a high speed (the acceleration pattern (high speed)) in which the increase delay period is short than at the time of a low speed (the acceleration pattern (low speed)), as exemplified as time points t1, t2 in FIG. 8. On this account, regardless of the acceleration pattern to be used, the I/C bypass valve 34 can be switched at an appropriate timing in consideration of the influence of rise or fall of the engine rotation speed NE during acceleration.

Further, as described above, the change of the intake gas temperature by the cooler bypass mechanism is earlier than the change of the actual EGR rate by the EGR device 40. On this account, if the actual EGR rate is low at the time when the I/C bypass valve 34 is opened based on the above determination to be performed from the viewpoint of the restrain of generation of condensed water, it is concerned that knocking may easily occur under the high intake gas temperature $T_H$. In this regard, in the above routine, when it is determined that the torque fluctuation TF is higher than the determination value during the increase delay period after the I/C bypass valve 34 is opened along with the increase of the estimated dew point to the I/C cooling water temperature or more, the ignition timing is retarded. With such a combination of such a changeover determination using the estimated dew point with an ignition timing control, it is possible to ensure that the torque fluctuation TF does not become excessive, while giving priority to the restraint of generation of condensed water.

Next will be described Embodiment 3 of the present disclosure with reference to FIGS. 10 and 11.

System Configuration of Embodiment 3 In the following description, the configuration illustrated in FIG. 1 is used as an example of a system configuration of Embodiment 3.

The present embodiment is targeted for an example in which the high EGR rate region is shifted to the low EGR rate region at the time of a transient operation along with a deceleration request (hereinafter referred to as a "deceleration transition"). In this example, reversely to the acceleration transition targeted in Embodiment 2, the actual EGR rate becomes excessive with respect to the target EGR rate because of a delay in change of the actual EGR rate. Accordingly, when the I/C bypass valve 34 is closed immediately with disregard to the delay, in response to a request of the low EGR rate region at the time of deceleration, the low intake gas temperature $T_L$ is used under the "high EGR rate." As a result, condensed water is generated.

Figure 10:
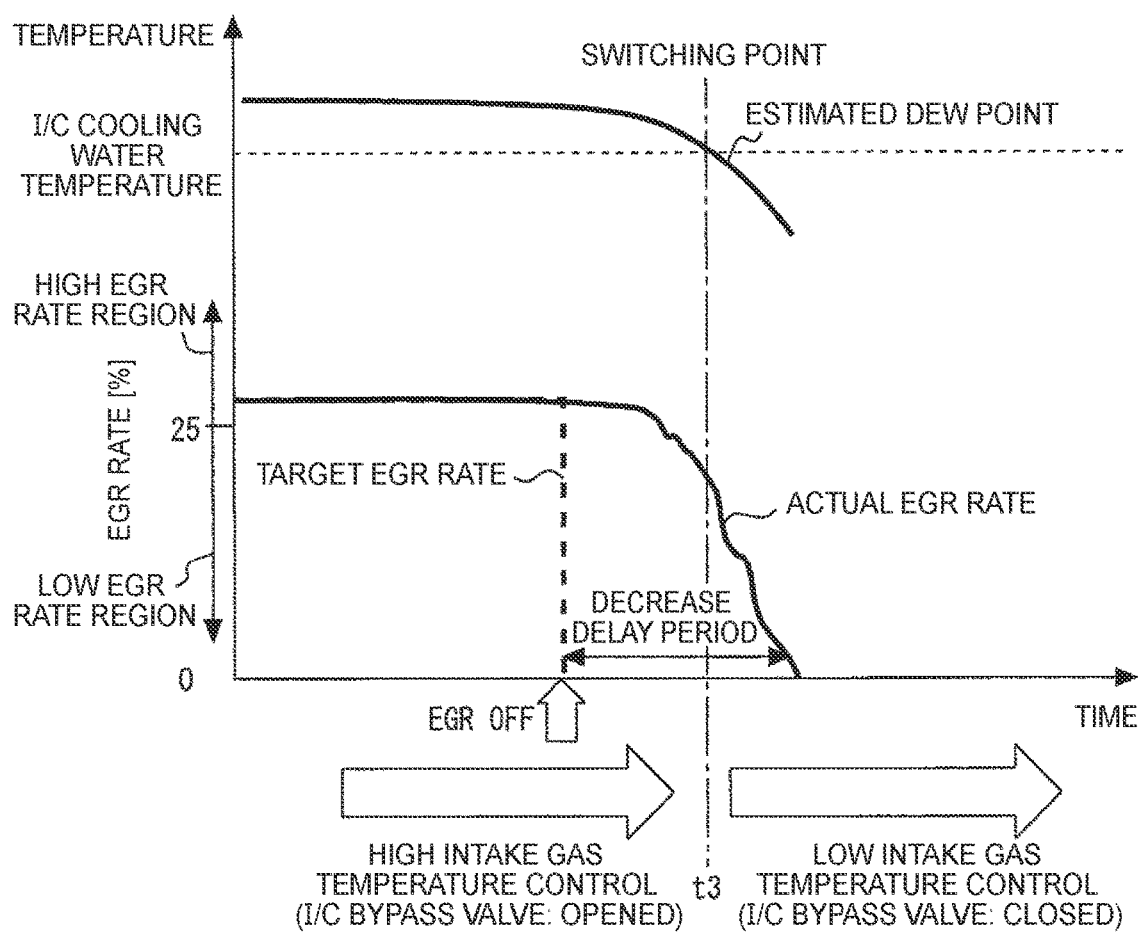
FIG. 10 is a time chart to describe a control at the time of deceleration transition in Embodiment 3 of the present disclosure.

FIG. 10 is a time chart to describe a control at the time of deceleration transition in Embodiment 3 of the present disclosure. In FIG. 10, an exemplary transition of the actual EGR rate during a deceleration transient operation is illustrated. As illustrated in FIG. 10, the target EGR rate immediately falls along with return of the accelerator pedal. On the other hand, the actual EGR rate has the above delay. Note that, in FIG. 10, the target EGR rate is changed to zero as an example of the low EGR rate of less than 25%.

In the present embodiment, during a decrease delay period of the actual EGR rate at the time of deceleration transition that requests the low EGR rate region like the example illustrated in FIG. 10 (a period during which the actual EGR rate is higher than the target EGR rate), the following control is performed. That is, also in the present embodiment, the actual EGR rate during the deceleration transient operation is estimated based on the engine rotation speed NE, similarly to Embodiment 2. A dew point of the intake gas (the fuel mixture of the intake air and the EGR gas) during the deceleration transient operation is estimated based on an estimated value (an estimated EGR rate) of the actual EGR rate.

However, the dew point to be targeted for the estimation in the present embodiment is a dew point of the intake gas (the fuel mixture of the intake air and the EGR gas) on the presumption that the I/C bypass valve 34 is closed during opening of the I/C bypass valve 34 after a start of the decrease delay period, differently from Embodiment 2. Accordingly, an intake gas temperature used for the calculation of the estimated dew point in the present embodiment is an intake gas temperature to be obtained if the I/C bypass valve 34 is closed during the decrease delay period, that is, the low intake gas temperature $T_L$, differently from Embodiment 2 that uses a current intake gas temperature during the increase delay period.

Besides, in the present embodiment, when the estimated dew point is decreased to the I/C cooling water temperature or less during the deceleration delay period (for example, see a time point t3 in FIG. 10), switching of the I/C bypass valve 34 (that is, switching from opening to closing) is performed.

FIG. 11 is a flowchart illustrating a routine of a process related to a control in Embodiment 3 of the present disclosure.

In the routine illustrated in FIG. 11, the ECU 50 first determines whether the following three conditions are established or not (step S300). The three conditions are as follows: the engine warm-up is completed; the high EGR rate region is being used; and the cooler bypass valve 34 is opened. Note that whether or not the engine warm-up is completed can be performed by use of the process of step S100 described above. Whether or not the high EGR rate region is being used can be performed by use of the process of step S110.

When the determination in step S300 is not established, the ECU 50 finishes a present process cycle of the routine. Meanwhile, when the determination in step S300 is established, the ECU 50 determines whether or not a deceleration transient operation is being performed (step S302). This determination can be made based on whether or not an absolute value of a decrease amount of the opening degree of the throttle valve 22 is a predetermined determination value or more during the use of the high EGR rate region, for example.

When the deceleration transient operation is not being performed, the ECU 50 finishes a present processing cycle of this routine. In the meantime, when the deceleration transient operation is being performed, the ECU 50 determines whether the target EGR rate is lower than the actual EGR rate or not (step S304). The actual EGR rate during the deceleration transient operation is estimated by the technique described in step S206 described above.

When the determination in step S304 is not established, that is, when the actual EGR rate decreases to the target EGR rate or less, the ECU 50 performs a process of closing the I/C bypass valve 34 and selects the small EGR map (step S306).

In the meantime, when the determination in step S304 is established, that is, when it is during the decrease delay period, the ECU 50 calculates an estimated dew point on the presumption that the low intake gas temperature $T_L$ is used, based on parameters such as an estimated value of the actual EGR rate and the low intake gas temperature $T_L$ (step S308). Subsequently, the ECU 50 determines whether or not the estimated dew point thus calculated is the I/C cooling water temperature or less (step S310).

When the determination in step S310 is not established, that is, when it can be determined that condensed water would be generated if the low intake gas temperature $T_L$ along with cooling of the intake gas by the intercooler 24 is currently used, the ECU 50 proceeds to step S312. In step S312, the process of opening the I/C bypass valve 34 is performed (continued), and the large EGR map is selected continuously.

In the meantime, when the estimated dew point decreases to the I/C cooling water temperature, that is, when it can be determined that condensed water would not be generated even if the low intake gas temperature $T_L$ is selected, the ECU 50 proceeds to step S314. In step S314, the ECU 50 performs the process of closing the I/C bypass valve 34 and selects the small EGR map.

In the process of the routine illustrated in FIG. 11 as described above, in the decrease delay period (the target EGR rate<the actual EGR rate) during the deceleration transient operation to shift from the high EGR rate region to the low EGR rate region, the I/C bypass valve 34 is opened (that is, the closing of the I/C bypass valve 34 is forbidden) and the large EGR map is used while the estimated dew point with respect to the intake gas on the presumption that the I/C bypass valve 34 is closed exceeds the I/C cooling water temperature. With such a control, during a period in which condensed water would be generated if the I/C bypass valve 34 is closed promptly because the estimated dew point calculated on the presumption that the low intake gas temperature $T_L$ is used exceeds the I/C cooling water temperature, the closing of the I/C bypass valve 34 is forbidden, so that generation of condensed water can be restrained.

Further, in the process of the routine, after the estimated dew point decreases to the I/C cooling water temperature or less, the I/C bypass valve 34 is closed and the small EGR map is used. Hereby, it is possible to restrain knocking from easily occurring by use of the high intake gas temperature $T_H$ under the low EGR rate.

Further, in the process of the routine, similarly to Embodiment 2, the actual EGR rate is estimated in consideration of the influence of the engine rotation speed NE. On this account, the estimated dew point calculated based on the estimated value of the actual EGR is also calculated in consideration of the influence of the engine rotation speed NE (that is, a point where the decrease delay period of the actual EGR rate varies depending on rise or fall of the engine rotation speed NE). Accordingly, in the present embodiment, the I/C bypass valve 34 can be also switched at an appropriate timing in consideration of the influence of rise or fall of the engine rotation speed NE during deceleration.

In the meantime, Embodiment 2 as described above exemplifies the acceleration transition as a state where the increase delay period of the actual EGR rate with respect to the target EGR rate occurs at the time of shifting from the low EGR rate region to the high EGR rate region. However, also in a case where the deceleration is performed for the high EGR rate region during the use of the engine operating point on a heavy-load side relative to the high EGR rate region (the large-EGR introduction region) as illustrated in FIG. 6 (that is, in a case of the deceleration transition from the low EGR rate region to the high EGR rate region) also corresponds to one example of shifting from the low EGR rate region to the high EGR rate region, and the increase delay period can occur. On this account, the control with respect to the increase delay period of the actual EGR rate may be applied to not only the acceleration transition, but also the deceleration transition exemplified herein, for example.

Further, in Embodiment 3 as described above exemplifies the deceleration transition as a state where the decrease delay period of the actual EGR rate with respect to the target EGR rate occurs at the time of shifting from the high EGR rate region to the low EGR rate region. However, also in a case where the acceleration is performed to request the low EGR rate region on a heavy-load side during the use of the engine operating point within the high EGR rate region (the large-EGR introduction region) as illustrated in FIG. 6 (that is, in a case of the acceleration transition from the high EGR rate region to the low EGR rate region) also corresponds to one example of shifting from the high EGR rate region to the low EGR rate region, and the decrease delay period can occur. On this account, the control with respect to the decrease delay period of the actual EGR rate may be applied to not only the deceleration transition, but also the acceleration transition exemplified herein, for example.

Further, Embodiments 1 to 3 exemplify the internal combustion engine 10 including the LPL-type EGR device 40. However, the EGR device targeted for the present disclosure may be any EGR device including an EGR passage configured to connect an intake passage on an upstream side relative to an intercooler to an exhaust passage. That is, a connecting position (the EGR gas inlet) of the EGR passage with respect to the intake passage is not limited to the upstream side relative to the compressor like the example of the internal combustion engine 10, but may be a part on the downstream side relative to the compressor and between the throttle valve and the intercooler. Further, a connecting position (an EGR gas outlet) of the EGR passage with respect to the exhaust passage is not necessarily limited to the downstream side relative to the turbine, but may be determined to any position on the exhaust passage.

Further, Embodiments 1 to 3 exemplify the internal combustion engine 10 configured such that the compressor 20*a* of the turbosupercharger 20 is provided in the intake passage 12. However, the compressor targeted for the present disclosure is not limited to the compressor included in the turbosupercharger, provided that the compressor supercharges an intake air. That is, for example, the compressor may be a compressor driven by use of a torque of a crankshaft, or may be an electrically-driven compressor.

Further, examples described in each embodiment as described above and other modifications may be combined appropriately within a possible range, other than combinations clearly stated above, and may be variously modified without departing from the gist of the present disclosure.

What is claimed is:

1. A control device for an internal combustion engine, the internal combustion engine including
    an ignition device configured to ignite a fuel and air mixture in a cylinder,
    a supercharger including a compressor provided in an intake passage,
    an intercooler configured to cool an intake gas compressed by the compressor,
    an exhaust gas recirculation device including an exhaust gas recirculation passage configured to connect the intake passage on an upstream side relative to the intercooler to an exhaust passage,
    a cooler bypass passage connected to the intake passage so as to bypass the intercooler, and
    a passage switching valve configured to switch between a cooler passing passage mode in which the intake gas passes through the intercooler and a cooler bypass passage mode in which the intake gas passes through the cooler bypass passage, the control device comprising:
    an electronic control unit configured to control the passage switching valve such that the cooler bypass passage mode is selected while at least part of a high exhaust gas recirculation rate region requesting a high exhaust gas recirculation rate of 25% or more is used,
    the electronic control unit being configured to control the passage switching valve such that the cooler passing passage mode is selected while at least part of a low exhaust gas recirculation rate region requesting a low exhaust gas recirculation rate of less than 25% is used,
    the high exhaust gas recirculation rate region and the low exhaust gas recirculation rate region being included in an operating region of the internal combustion engine.

2. The control device for the internal combustion engine, according to claim 1, wherein
    the electronic control unit is configured not to control the passage switching valve such that the cooler bypass passage mode is selected, during an increase delay period of an actual exhaust gas recirculation rate with respect to a target exhaust gas recirculation rate at a time of shifting from the low exhaust gas recirculation rate region to the high exhaust gas recirculation rate region.

3. The control device for the internal combustion engine, according to claim 2, wherein
    the electronic control unit is configured to permit the passage switching valve to be controlled such that the cooler bypass passage mode is selected, when a dew point of a fuel mixture of an intake air and an exhaust gas recirculation gas increases to a temperature of cooling water or more during the increase delay period, the cooling water being circulating through the intercooler.

4. The control device for the internal combustion engine, according to claim 3, wherein
    the electronic control unit is configured to control the ignition device such that an ignition timing is retarded, when an engine torque fluctuation is higher than a determination value during the increase delay period after the passage switching valve is controlled such that the cooler bypass passage mode is selected, along with the increase of the dew point of the fuel mixture to the temperature of the cooling water or more.

5. The control device for the internal combustion engine, according to claim 1, wherein
    the electronic control unit is configured not to control the passage switching valve such that the cooler passing passage mode is selected, during a decrease delay period of an actual exhaust gas recirculation rate with respect to a target exhaust gas recirculation rate at a time of shifting from the high exhaust gas recirculation rate region to the low exhaust gas recirculation rate region.

6. The control device for the internal combustion engine, according to claim 5, wherein
    the electronic control unit is configured not to control the passage switching valve such that the cooler passing passage mode is selected, until a dew point of a fuel mixture of an intake air and the exhaust gas recirculation gas on the presumption that the cooler passing passage mode is selected after a start of the decrease delay period decreases to a temperature of cooling water or less during the decrease delay period, the cooling water being circulating through the intercooler.

7. The control device for the internal combustion engine, according to claim 3, wherein:

the electronic control unit is configured to estimate the actual exhaust gas recirculation rate based on an engine rotation speed; and the electronic control unit is configured to estimate the dew point of the fuel mixture based on the actual exhaust gas recirculation rate thus estimated.

8. A control method for an internal combustion engine, the internal combustion engine including an ignition device configured to ignite a fuel and air mixture in a cylinder, a supercharger including a compressor provided in an intake passage, an intercooler configured to cool an intake gas compressed by the compressor, an exhaust gas recirculation device including an exhaust gas recirculation passage configured to connect the intake passage on an upstream side relative to the intercooler to an exhaust passage, a cooler bypass passage connected to the intake passage so as to bypass the intercooler, and a passage switching valve configured to switch between a cooler passing passage mode in which the intake gas passes through the intercooler and a cooler bypass passage mode in which the intake gas passes through the cooler bypass passage, and an electronic control unit, the control method comprising:

controlling, by the electronic control unit, the passage switching valve such that the cooler bypass passage mode is selected while at least part of a high exhaust gas recirculation rate region requesting a high exhaust gas recirculation rate of 25% or more is used; and controlling, by the electronic control unit, the passage switching valve such that the cooler passing passage mode is selected while at least part of a low exhaust gas recirculation rate region requesting a low exhaust gas recirculation rate of less than 25% is used, the high exhaust gas recirculation rate region and the low exhaust gas recirculation rate region being included in an operating region of the internal combustion engine.

* * * * *